US012756227B1

(12) United States Patent
Sylvester et al.

(10) Patent No.: US 12,756,227 B1
(45) Date of Patent: Oct. 6, 2026

(54) ROADWAY SECTION HAVING EMBEDDED WIRELESS CHARGE ELEMENTS

(71) Applicant: INTEGRATED ROADWAYS IP LLC, Miami Beach, FL (US)

(72) Inventors: Tim Sylvester, Kansas City, MO (US); Tiziano Pedersoli, Overland Park, KS (US)

(73) Assignee: INTEGRATED ROADWAYS IP LLC, Miami Beach, FL (US)

( * ) Notice: Subject to any disclaimer, the term of this patent is extended or adjusted under 35 U.S.C. 154(b) by 846 days.

(21) Appl. No.: 18/183,286

(22) Filed: Mar. 14, 2023

(51) Int. Cl.

| | |
|---|---|
| ***H01M 10/46*** | (2006.01) |
| ***E01C 9/00*** | (2006.01) |
| ***H02J 50/00*** | (2016.01) |
| ***H02J 50/10*** | (2016.01) |

(52) U.S. Cl.
CPC .............. *H02J 50/005* (2020.01); *E01C 9/00* (2013.01); *H02J 50/10* (2016.02)

(58) Field of Classification Search
CPC ........ H02J 50/005; H02J 50/10; H02J 7/0042; E01C 9/00
USPC ................................ 320/104, 107, 108, 109
See application file for complete search history.

(56) References Cited

U.S. PATENT DOCUMENTS

| | | | | |
|---|---|---|---|---|
| 4,836,344 | A | 6/1989 | Bolger | |
| 5,573,090 | A | 11/1996 | Ross | |
| 9,511,674 | B2 | 12/2016 | Keeling et al. | |
| 9,533,590 | B2 * | 1/2017 | Keeling | B60L 5/005 |
| 10,449,865 | B2 | 10/2019 | Rumbak | |
| 11,376,966 | B2 | 7/2022 | Covic et al. | |
| 11,999,252 | B2 | 6/2024 | Hanson et al. | |
| 12,246,604 | B1 * | 3/2025 | Sylvester | H02J 50/10 |
| 2011/0184842 | A1 * | 7/2011 | Melen | B60L 53/39 320/108 |
| 2012/0161530 | A1 * | 6/2012 | Urano | H02J 50/90 307/104 |
| 2015/0225906 | A1 | 8/2015 | Curran et al. | |
| 2017/0282732 | A1 * | 10/2017 | Lewis | B60L 5/005 |
| 2018/0178666 | A1 * | 6/2018 | Javaid | B60L 53/39 |
| 2022/0402365 | A1 | 12/2022 | Covic et al. | |
| 2025/0353388 | A1 * | 11/2025 | Borhan | B60L 53/12 |

FOREIGN PATENT DOCUMENTS

| | | | | |
|---|---|---|---|---|
| DE | 202009011611 U1 * | 11/2009 | | B60L 9/00 |

* cited by examiner

*Primary Examiner* — Edward Tso
(74) *Attorney, Agent, or Firm* — Fredrikson & Byron, P.A.

(57) ABSTRACT

A roadway section enables dynamic wireless power transfer to a vehicle and comprises pavement material and wireless power chargers. The pavement material extends along a longitudinal axis. The wireless power chargers are spaced apart along the longitudinal axis and include first, second and third conductive elements each being configured to emit a magnetic field. The second conductive element is adjacent to and spaced apart from the first conductive element at a first distance along the longitudinal axis. The third conductive element is adjacent to and spaced apart from the second conductive element at a second distance along the longitudinal axis that is longer than the first distance. The third conductive element is angled toward the second conductive element.

20 Claims, 14 Drawing Sheets

ROADWAY SECTION HAVING EMBEDDED WIRELESS CHARGE ELEMENTS

CROSS-REFERENCE TO RELATED APPLICATIONS

The present application is filed contemporaneously with identically-titled U.S. patent application Ser. No. 18/183,304, filed Mar. 14, 2023, the entire disclosure of which is hereby incorporated by reference herein.

BACKGROUND

Battery-powered electric vehicles are becoming increasingly common in many applications, including for both individual and commercial transportation. However, such vehicles often do not have the same range capabilities as their similarly priced combustion engine counterparts. Specifically, to obtain more range, more battery materials must be used to form a larger battery, which often renders a vehicle prohibitively expensive for too many individuals. Additionally, the weight of such a longer-range battery incurs additional engineering costs in the design and manufacture of the vehicle and additional costs due to the use of additional and/or enhanced non-battery components. Further, charging stations are often scarce, and charging a battery at a charging station can be time consuming compared to filling a fuel tank.

The background discussion is intended to provide information related to the present invention which is not necessarily prior art.

SUMMARY OF THE INVENTION

The present invention addresses one or more of the above-described problems and other problems by providing a roadway section that enables dynamic wireless power transfer to a vehicle.

A roadway section constructed according to an embodiment of the present invention comprises pavement material and first, second, and third power chargers. The pavement material extends along a longitudinal axis. The first, second, and third wireless power chargers are spaced apart along the longitudinal axis and respectively comprise first, second, and third conductive elements each being configured to emit a magnetic field for dynamic wireless power transfer to the vehicle. The second conductive element is adjacent to the first conductive element and spaced apart from the first conductive element at a first distance along the longitudinal axis. The third conductive element is adjacent to the second conductive element and spaced apart from the second conductive element at a second distance along the longitudinal axis that is longer than the first distance.

The third conductive element has a center of gravity, and a first imaginary axis extends between the center of gravity of the third conductive element and a point of the top surface closest to the center of gravity. An imaginary plane intersects the center of gravity of the third conductive element, the closest point of the top surface, and a point on the second conductive element that is closest to the third conductive element. The third conductive element includes a first segment proximal to the second conductive element and having a first uppermost point in the imaginary plane and a second segment distal from the second conductive element and having a second uppermost point in the imaginary plane. A theoretical line drawn between the first and second uppermost points defines an angle of slope of the third conductive element relative to the imaginary axis within the imaginary plane and on the side of the imaginary axis proximal to the second conductive element. The angle is at least ninety and one-half degrees (90.5°). By orienting the third conductive element toward the larger gap between the third conductive element and the second conductive element, magnetic flux density is increased above the pavement material over the longer gap.

A roadway section constructed according to one or more embodiments of the present invention broadly comprises pavement material and first, second, and third wireless power chargers. The pavement material extends along a longitudinal axis and has a top surface. The first, second, and third wireless power chargers are spaced apart along the longitudinal axis and respectively comprise first, second, and third conductive elements each being configured to emit a magnetic field for dynamic wireless power transfer to the vehicle. The second conductive element is adjacent to the first conductive element and spaced apart from the first conductive element at a first distance along the longitudinal axis. The third conductive element is adjacent to the second conductive element and spaced apart from the second conductive element at a second distance along the longitudinal axis that is longer than the first distance. The third conductive element is oriented so that the third conductive element is operable to emit a magnetic field with a magnetic axis extending in a direction toward the top surface and the second conductive element.

A roadway section constructed according to one or more embodiments of the present invention broadly comprises pavement material and first, second, and third wireless power chargers. The pavement material extends along a longitudinal axis and has a top surface. The first, second, and third wireless power chargers are spaced apart along the longitudinal axis and respectively comprise first, second, and third conductive elements each being configured to emit a magnetic field for dynamic wireless power transfer to the vehicle. The second conductive element is adjacent to the first conductive element and spaced apart from the first conductive element at a first distance along the longitudinal axis. The third conductive element is adjacent to the second conductive element and spaced apart from the second conductive element at a second distance along the longitudinal axis that is longer than the first distance. The third conductive element has a center of gravity, and an imaginary axis extends between the center of gravity of the third conductive element and a point of the top surface closest to the center of gravity. The third conductive element is oriented so that a magnitude of magnetic flux density emitted by the third conductive element above the top surface is highest at a point on the side of the imaginary axis proximal to the second conductive element.

A roadway section constructed according to one or more embodiments of the present invention broadly comprises pavement material, first, second, and third wireless power chargers, and a magnetic shielding layer. The pavement material extends along a longitudinal axis and has a top surface. The first, second, and third wireless power chargers are spaced apart along the longitudinal axis and respectively comprise first, second, and third conductive elements each being configured to emit a magnetic field for dynamic wireless power transfer to the vehicle. The second conductive element is adjacent to the first conductive element and spaced apart from the first conductive element at a first distance along the longitudinal axis. The third conductive element is adjacent to the second conductive element and spaced apart from the second conductive element at a second distance along the longitudinal axis that is longer than the first distance. The magnetic shielding layer is located within the pavement material beneath the third conductive element so that at least a portion of the third conductive element is between the magnetic shielding layer and the top surface of the pavement material.

The magnetic shielding layer is configured to cause a magnitude of magnetic flux density emitted from the third conductive element above the top surface to be highest between the second conductive element and an imaginary axis extending from a center of gravity of the third conductive element to a nearest top surface of the pavement material. By configuring the magnetic shielding layer in this manner, a magnetic flux density above the pavement material over the longer gap is increased.

A roadway section constructed according to one or more embodiments of the present invention broadly comprises pavement material, first, second, and third wireless power chargers, and first, second, and third magnetic shielding layers. The pavement material extends along a longitudinal axis and has a top surface. The first, second, and third wireless power chargers are spaced apart along the longitudinal axis and respectively comprise first, second, and third conductive elements each being configured to emit a magnetic field for dynamic wireless power transfer to the vehicle. The second conductive element is adjacent to the first conductive element and spaced apart from the first conductive element at a first distance along the longitudinal axis. The third conductive element is adjacent to the second conductive element and spaced apart from the second conductive element at a second distance along the longitudinal axis that is longer than the first distance. The first, second and third magnetic shielding layers are located within the pavement material. The first magnetic shielding layer is beneath the first conductive element. The second magnetic shielding layer is beneath the second conductive element. The third magnetic shielding layer is beneath the third conductive element and is configured to shift at least a portion of magnetic flux density of the magnetic field emitted from the third conductive element toward the second conductive element.

A roadway section constructed according to one or more embodiments of the present invention broadly comprises pavement material, first, second, and third wireless power chargers, and first, second, and third magnetic shielding planar substrates. The pavement material extends along a longitudinal axis and has a top surface. The first, second, and third wireless power chargers are spaced apart along the longitudinal axis and respectively comprise first, second, and third conductive elements each being configured to emit a magnetic field for dynamic wireless power transfer to the vehicle. The second conductive element is adjacent to the first conductive element and spaced apart from the first conductive element at a first distance along the longitudinal axis. The third conductive element is adjacent to the second conductive element and spaced apart from the second conductive element at a second distance along the longitudinal axis that is longer than the first distance. The first, second and third magnetic shielding planar substrates are located within the pavement material. The first magnetic shielding planar substrate is beneath the first conductive element and has a first upper surface. The second magnetic shielding planar substrate is beneath the second conductive element and has a second upper surface. The third magnetic shielding planar substrate is beneath the third conductive element and has a third upper surface that is sloped toward the second magnetic shielding planar substrate.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
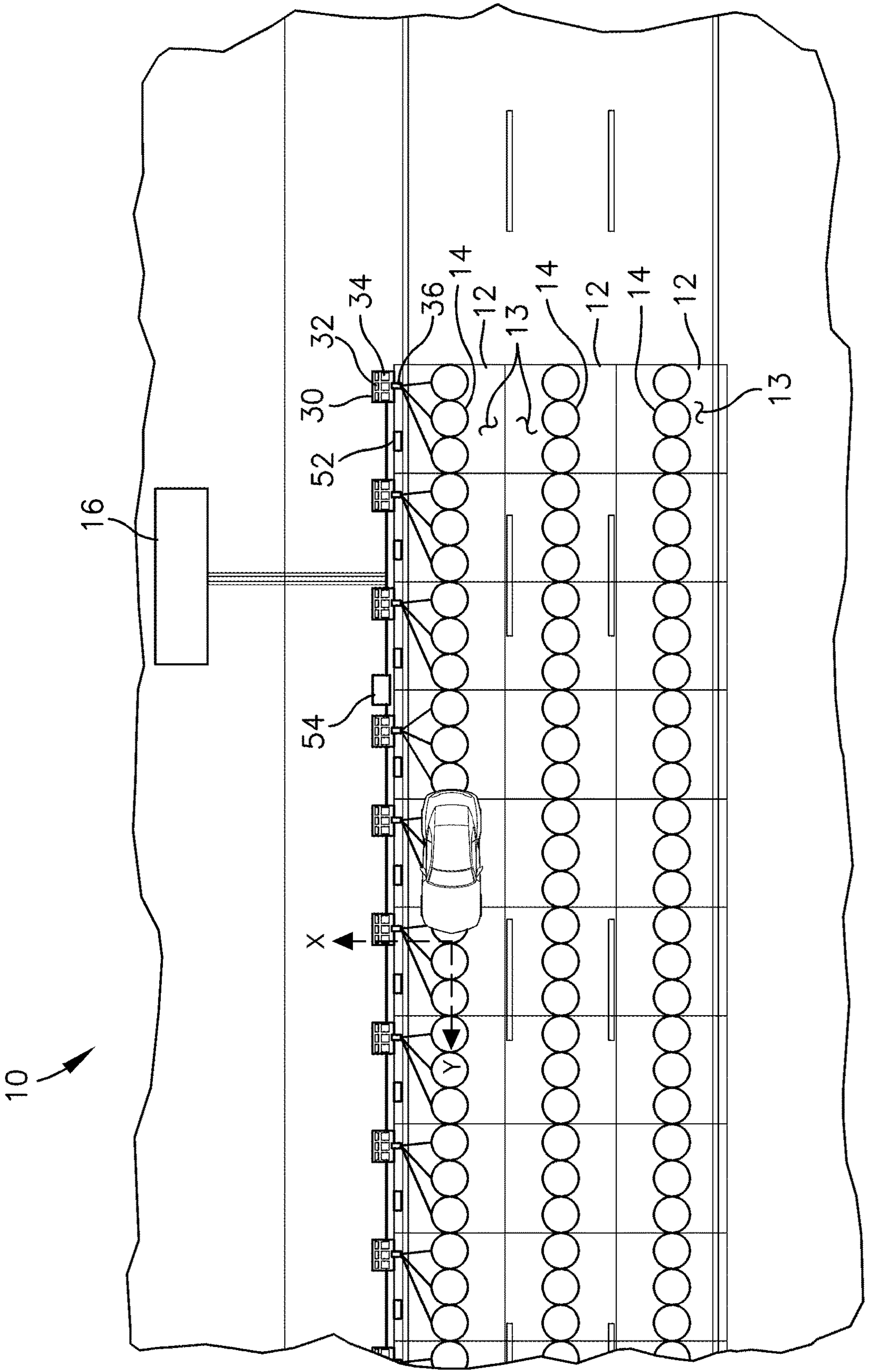
FIG. 1 is a top plan view of pavement system constructed in accordance with embodiments of the present invention.

The drawing figures do not limit the current invention to the specific embodiments disclosed and described herein. While the drawings do not necessarily provide exact dimensions or tolerances for the illustrated components or structures, the drawings are to scale as examples of certain embodiments with respect to the relationships between the components of the structures illustrated in the drawings.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

FIG. 1 illustrates an exemplary pavement system 10 in accordance with embodiments of the present invention. The system 10 includes a plurality of slabs 12 aligned along a longitudinal or y-axis corresponding to a direction of travel of vehicles or other masses across top surfaces 13 of the slabs 12. The system includes three (3) lanes, each being respectively formed from a plurality of slabs 12 aligned along the y-axis. Each lane may include one or more roadway sections, each of which may include one or more slabs 12. It is foreseen that the pavement system may include more or fewer lanes without departing from the spirit of the present invention.

The slabs 12 may be pre-cast slabs comprising concrete paving material, described in the exemplary embodiment in more detail below. It should be noted, however, that in one or more embodiments the pavement system may comprise one or more lanes formed of cast-in-place concrete installations, continuous pour asphalt pavement material, or other pavement types. In cast-in-place installations, roadway sections may include one or more lengths of roadway separated by saw cut joints, typically made to reduce the chances of roadway damage/cracking from cyclical expansion and contraction.

Figure 3A:
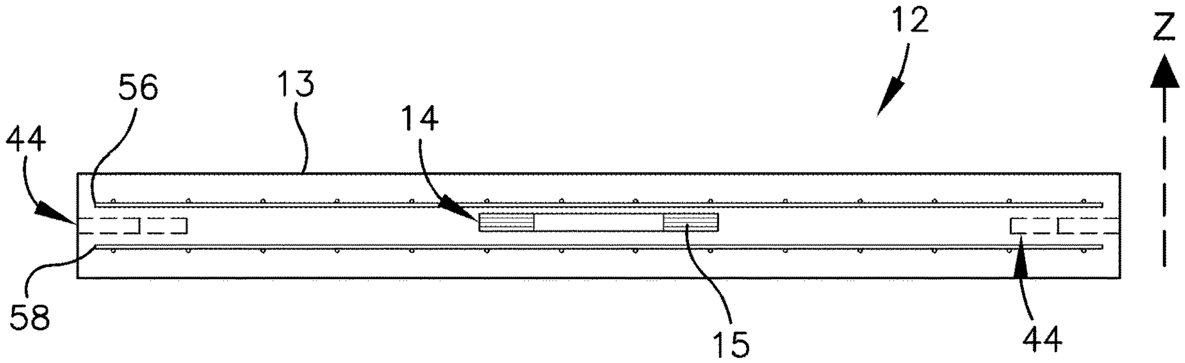
FIG. 3A is a cross section of a roadway section from the pavement system of FIG. 1, taken along an x-axis of the system and bisecting a wireless power charger, particularly illustrating the wireless power charger positioned between an upper reinforcement layer and a lower reinforcement layer, all embedded within the roadway section.

Each slab 12 of the illustrated embodiment includes three (3) wireless chargers 14. The wireless chargers 14 may include or comprise wireless charge emitters and/or transceivers. Each wireless charge emitter and/or transceiver preferably includes one or more conductive element 15 (see FIG. 3A), such as coil(s) or layers of electrically conductive material (discussed in more detail below), configured to conduct current of supplied power in a spatial pattern that generates and projects a magnetic field extending up and above the top surface 13 of the corresponding roadway section for wireless battery charging of passing vehicles (e.g., according to Faraday's law of induced voltage). The term "electrically conductive material" means a material within which electric current freely flows, i.e., a material with a resistivity of less than about one thousand (1,000) ohm-meter. Examples of electrically conductive materials include steel, iron, aluminum, copper, graphite and conductive carbon. Correspondingly the term "non-electrically conductive material" means a material within which electric current does not freely flow, i.e., a material with a resistivity greater than about one thousand (1,000) ohm-meter or at least ten thousand (10,000) ohm-meter. Examples of non-electrically conductive materials include polymer and ferrite.

Each of the wireless chargers 14 may be configured for unidirectional charging of batteries of vehicles passing along a top surface 13 of the slabs 12 or for bidirectional charging in communication with electrical circuits positioned on or adjacent to the top surface 13 of the slabs. In one or more embodiments, the wireless chargers 14 are configured to produce, generate, or emit a magnetic field upward for induced charging of an electrical circuit (e.g., a battery circuit) of a passing vehicle. The electrically-conductive element 15 of each wireless charger 14 may comprise one or more conductive wires or plates arranged, placed, or positioned to form a coil or toroid shape that is substantially symmetrical across at least two (preferably perpendicular) axes. One of ordinary skill will appreciate that the coil or toroid may be rectangular, may be a spiral, may comprise a toroid with a rectangular or polygonal cross-section, may comprise a toroid with a circular cross section, or may be more irregularly shaped while retaining the symmetrical properties outlined herein, without departing from the spirit of the present invention. One of ordinary skill will appreciate that an individual slab or roadway section may include more or fewer wireless chargers, at different and/or variable spacing and/or of different configuration/shape, without departing from the spirit of the present invention.

One of ordinary skill will appreciate that each wireless power charger 14 preferably includes one or more additional electrically conductive wires or other conductors—such as power supply wires—in addition to the electrically-conductive element 15 for generating the magnetic field for inductive charging within the scope of the present invention. It should also be noted that the preferred wireless power charger 14 will additionally be encased, housed or coated in an electrically insulating or non-electrically conductive material layer (e.g., comprising rubber, resin, or other polymer, etc.). In the illustrated embodiments, the aforementioned layer is relatively thin and, for purposes of illustration, lies at and covers or coats the outside (e.g., outer and upper) boundaries or margins of the electrically conductive element 15. However, it is foreseen that in one or more embodiments the casing/housing or other non-conductive features of the chargers, and/or the conductors which are not part of the electrically conductive element, may in some cases extend significantly outside of the boundaries or margins (e.g., the upper and/or radially outer surfaces or profiles) of an electrically conductive element (for example) without departing from the spirit of the present invention.

Figure 5:
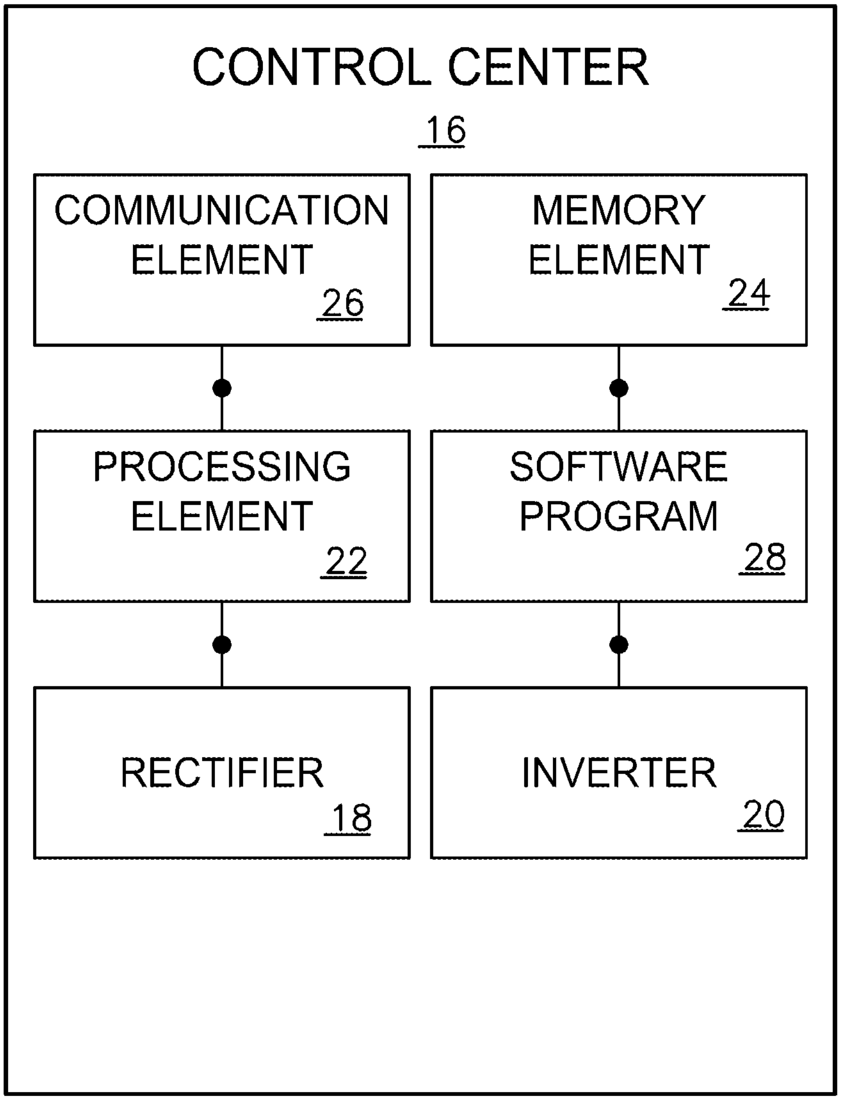
FIG. 5 is a schematic diagram depicting selected components of a control center of the pavement system of FIG. 1.

Power to the wireless chargers 14 is supplied, conditioned, tuned, transformed, converted and/or otherwise changed and/or controlled by one or more control centers 16. Turning briefly to FIG. 5, each control center 16 may include a rectifier 18, an inverter 20, a processing element 22, a memory element 24, a communication element 26, and a software program 28, each of which is discussed in more detail below. It should also be noted that one or more components of a control center may be housed remotely and/or embedded in or with components of a roadway section without departing from the spirit of the present invention.

The control center 16 receives power from a power supply such as a public utility line and/or from upstream switchgear (not shown), and prepares same for supply to the wireless chargers 14. For example, in one or more embodiments, the control center 16 receives alternating current (AC) power at 750 kW and 110 A, and increases the frequency of the power using the rectifier 18 and inverter 20 for supply to the wireless chargers 14.

The control center 16 may initially supply power to junction boxes 30. The switching device(s) 32 and corresponding tuning network device(s) 34 may serve as intermediate components for electrical communication between the wireless chargers 14 and the control center 16. One of ordinary skill will appreciate that more, fewer and/or different intermediate components may be used to supply power to wireless chargers without departing from the spirit of the present invention. The exemplary junction boxes 30 are adjacent the sides of the corresponding slabs 12 and may be set or embedded in a shoulder of the roadway, with top portions approximately flush with the top surface 13 of the roadway to provide periodic access thereto for maintenance.

Each junction box 30 may contain or include one or more switching device(s) 32 and corresponding tuning network device(s) 34, with each pair of switching device 32 and tuning network device 34 supplying power to one of the wireless chargers 14. The switching device 32 may, for example, be a metal-oxide-semiconductor field-effect transistor (MOSFET) switch or any other switch device for switching and/or amplifying the power signal to the corresponding wireless charger 14. The tuning network device 34 may, for example, be a transformer configured to increase or decrease the voltage and/or other characteristics of the power for supply to the corresponding wireless charger 14. The wires or conductors carrying the power to the wireless chargers 14 may be routed through one or more conduits and/or edge connectors 36 illustrated in FIG. 1.

In one or more embodiments, the processing element 22, the memory element 24, the communication element 26 and/or the software program 28 comprise a master controller. The master controller may be in electronic communication (e.g., via the communication element 26) with one or both of the switching device 32 and/or tuning network device 34 corresponding to each of the wireless chargers 14. The electronic communication may permit such electronic devices in each of the junction boxes 30 to provide data regarding operation and/or faults of the wireless chargers 14 and/or supporting power supply or control infrastructure and/or intermediate components. The electronic communication may also or alternatively permit the master controller to communicate commands to the junction box 30 electronic components and/or components of the wireless chargers 14, for example where the master controller commands one or more switching device(s) 32 to power or shut down power to the corresponding wireless charger(s) 14 or commands one or more network tuning device(s) 34 to increase or decrease the voltage of the power supplied to the corresponding wireless charger(s) 14.

Figure 2:
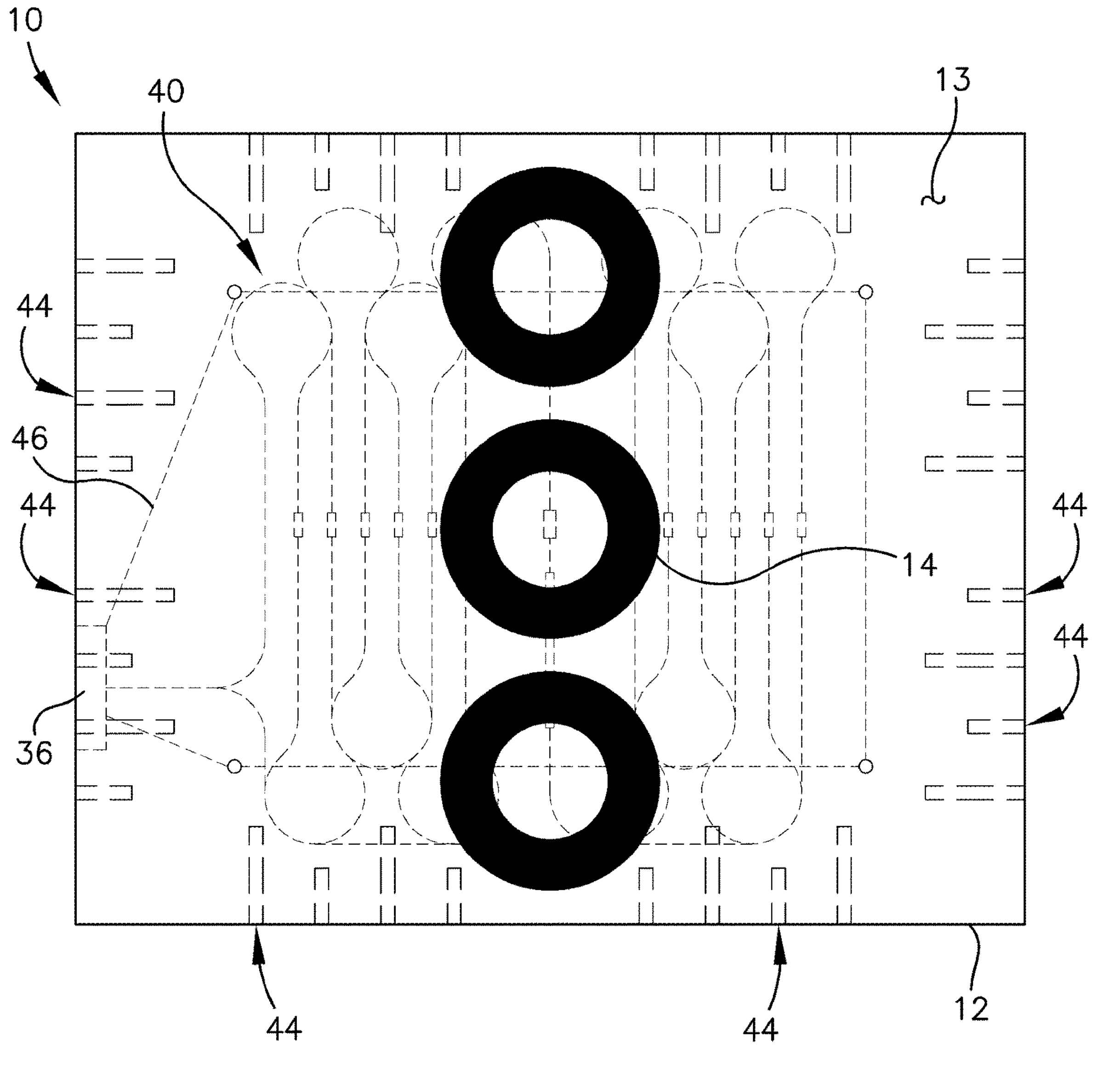
FIG. 2 is a schematic diagram depicting selected components of a slab of the pavement system of FIG. 1.

Turning to FIG. 2, in one or more embodiments each slab 12 includes a strain sensor array 40. The strain sensor array 40 is distributed at least partly, and preferably mostly, across the length and width of a body of the slab 12. The strain sensor array 40 may include one or more optical fiber sensors. The strain sensor array 40 may embody optical fiber sensing technologies including but not limited to one or more of Rayleigh, Brillouin, Raman, or Fiber Bragg Grating (FBG) technologies, with corresponding sensors or sampling area(s) distributed along the length of the fiber(s).

In one or more embodiments comprising FBGs, the FBGs are positioned in the optical fiber with selectable space therebetween. Each FBG, or any other method implemented as described above but not limited to those specifically named, provides a measurement of the strain of its surrounding environment, which is a local volume, element or region of the body. It should be noted that emitters and receivers of optical fiber sensors may comprise a single device or multiple devices. Generally, each FBG reflects an optical signal, of a particular wavelength or small band of wavelengths, that it receives. The characteristics, such as intensity, amplitude, wavelength, and/or time delay, of the optical signal reflection may vary according to a strain, potentially among other factors, placed on the FBG. One of ordinary skill will appreciate that various mechanisms for detecting strain—including mechanisms for detecting strain using other optical fiber sensing technologies—may be employed in the strain sensor array 40 within the scope of the present invention.

The optical fibers of the array 40 shown in FIG. 2 are implemented in elongated loops with enlarged turns on each end, with the loops being arranged in an alternating pattern offset relative to adjacent loops along the y-axis. However, one of ordinary skill will appreciate that sensors may be implemented within a body of pavement material in other patterns—for example, in a serpentine pattern layout, a coil pattern layout, a grid pattern, an array of individual fiber optic lines, or other geometric pattern layouts, without departing from the spirit of the present invention. Moreover, a sensor array may include more or fewer optical fibers and/or may comprise additional or alternative strain sensors (e.g., piezoelectric strain sensors) without departing from the spirit of the present invention.

The sensor array 40 may include and/or be in communication with supporting components—such as an embedded interrogator—within the scope of the present invention. For example, embodiments of the present invention are interoperable with the paving systems and sensor array(s) described in U.S. Patent Publication 2021/0222375 A1 to Sylvester, filed Apr. 9, 2021, which is hereby incorporated by reference herein in its entirety. In one or more embodiments, the control center 16 is in electronic communication (e.g., via the communication element 26) with an interrogator which, in turn, operates in conjunction with the fiber optic sensors of the sensor array 40 to generate sensor data.

Figure 4:
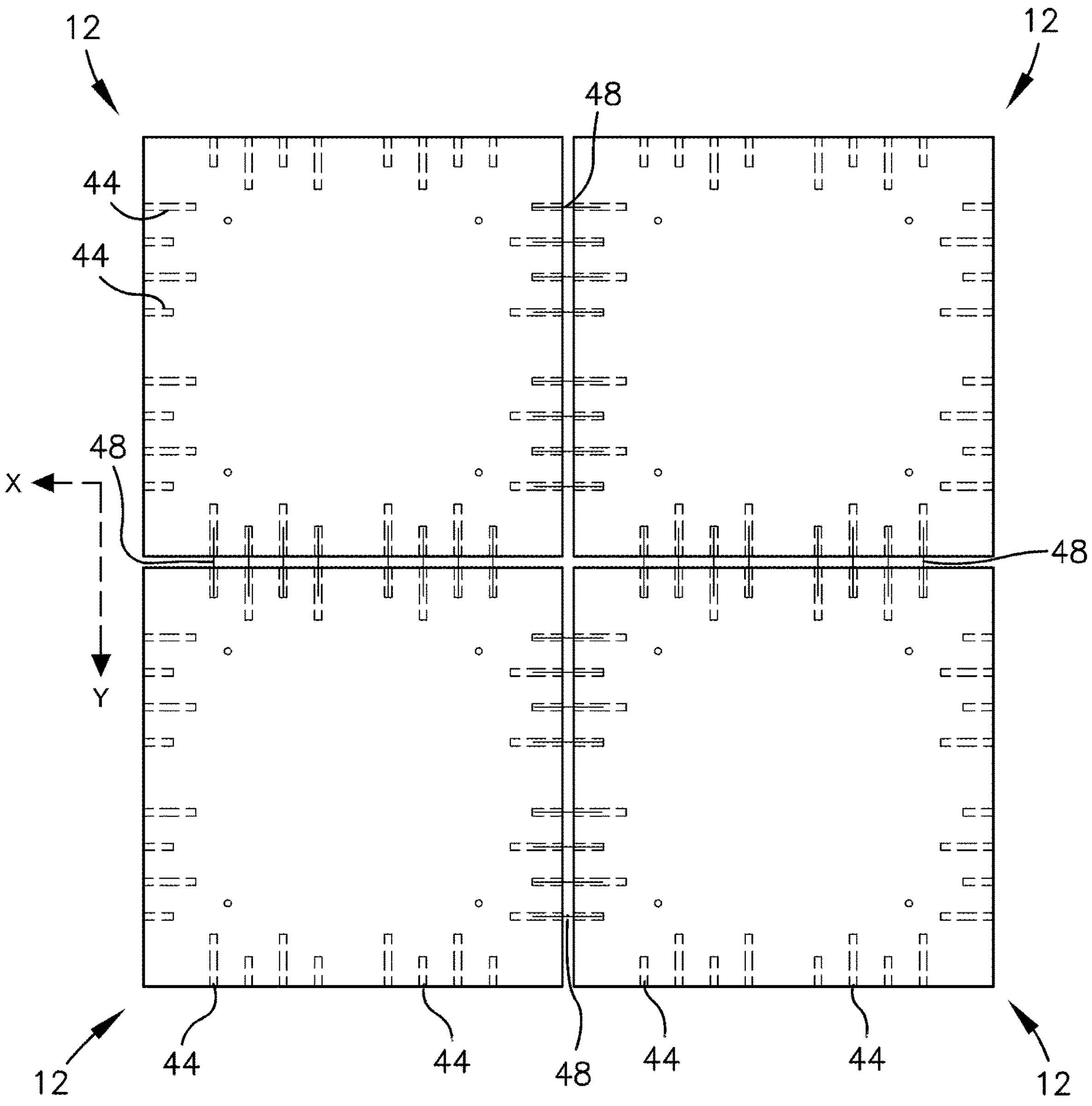
FIG. 4 is a schematic diagram depicting interconnecting structural components of a plurality of slabs of the pavement system of FIG. 1.

Turning briefly to FIG. 4, the slabs 12 of the illustrated embodiment also include structural links comprising load-transferring connectors 48 (e.g., dowel rods), discussed in more detail below. However, it should be noted that the paving material of the roadway and delineations between sections or sensing volumes, and associated structural components, may vary within the scope of the present invention. For example, cast-in-place concrete sections delineated by saw cut joints (e.g., without load-transferring connectors), or continuous pour installations (e.g., comprising asphalt without reinforcement layers or load-transferring connectors) are also within the scope of the present invention.

In one or more embodiments, a sensing volume of a section of pavement may comprise an area of the roadway monitored by a sensor array comprising fiber optic cable(s) and one or more interrogator(s), where each interrogator transmits and receives optical signals reflecting stress and strain in the section. In one or more embodiments, a sensing volume of a section of pavement comprises an area of the roadway delineated by physical boundaries comprising the sides of a pre-cast slab or a combination of saw cut joints and sides of a cast-in-place concrete installation.

An advantage of the pre-cast slabs 12 of the illustrated embodiment is realized through added data dimensionality available through monitoring condition and/or strains across multiple sensor arrays 40 respectively corresponding to multiple slabs 12 with load-transferring connectors 48 extending therebetween.

However, it is also foreseen that a sensor array may be omitted, alternatively configured or replaced by other sensing technologies without departing from the spirit of the present invention.

Returning to FIG. 1, the master controller of the control center 16 may additionally be in electronic communication (e.g., via wired connections 46 of FIG. 2) with and may receive strain sensor data from the strain sensor arrays 40 embedded in the slabs 12. The wired connections 46 may be routed via edge connectors 52 through one or more junction boxes 54 illustrated in FIG. 1 for communication to the master controller. The master controller may analyze the strain sensor data, alone and/or in communication with one or more remote server(s), to determine vehicle position on the pavement system and roadway sections and, accordingly, provide commands for activation/deactivation of the wireless chargers 14 and/or increasing or decreasing the voltage supplied to the wireless chargers 14.

The communication element 26 generally allows communication with systems or devices external to the control center 16. The communication element 26 may include signal or data transmitting and receiving circuits, such as antennas, amplifiers, filters, mixers, oscillators, digital signal processors (DSPs), and the like. The communication element 26 may establish communication wirelessly by utilizing RF signals and/or data that comply with communication standards such as cellular 2G, 3G, 4G, or 5G, IEEE 802.11 standard such as WiFi, IEEE 802.16 standard such as WiMAX, Bluetooth™, or combinations thereof. Alternatively, or in addition, the communication element 26 may establish communication through connectors or couplers that receive metal conductor wires or cables which are compatible with networking technologies such as ethernet. The communication element 26 may also couple with optical fiber cables, e.g., via an interrogator. The communication element 26 may be in communication with or electronically coupled to memory element 24 and/or processing element 22.

Preferably the devices of the pavement system communicate via secure and/or encrypted communication means. For example, all or some of the slabs 12, the control center 16 and remote server(s) may securely exchange transmissions using DES, 3DES, AES-128 or AES-256 encryption and/or RSA (748/1024/2048 bit) or ECDSA (256/384 bit) authentication. It is foreseen that any means for secure exchange may be utilized without departing from the spirit of the present invention.

The memory element 24 may include data storage components such as read-only memory (ROM), programmable ROM, erasable programmable ROM, random-access memory (RAM) such as static RAM (SRAM) or dynamic RAM (DRAM), cache memory, hard disks, floppy disks, optical disks, flash memory, thumb drives, USB ports, or the like, or combinations thereof. The memory element 24 may include, or may constitute, a "computer-readable medium." The memory element 24 may store the instructions, code, code segments, software, firmware, programs, applications, apps, services, daemons, or the like that are executed by the processing element 22, such as the software program 28. The memory element 24 may also store settings, data, documents, files, photographs, movies, images, databases, and the like, for example where such data is captured by additional infrastructure sensors and/or relates to utilization of the wireless chargers 14 by passing vehicles.

The processing element 22 may include processors, microprocessors, microcontrollers, DSPs, field-programmable gate arrays (FPGAs), analog and/or digital application-specific integrated circuits (ASICs), or the like, or combinations thereof. The processing element 22 may include digital processing unit(s). The processing element 22 may generally execute, process, or run instructions, code, code segments, software, firmware, programs, applications, apps, processes, services, daemons, or the like. The processing element 22 may also include hardware components, such as finite-state machines, sequential and combinational logic, and other electronic circuits that may perform the functions necessary for the operation of embodiments of the present invention. For example, the processing element 22 may execute the software program 28, where the software program 28 includes computer-readable instructions instructing the processing element 22 to complete all or some of the steps described herein. The processing element 22 may be in communication with the other electronic components through serial or parallel links that include address busses, data busses, control lines, and the like.

The slabs 12 may also each include one or more internal reinforcement grid(s) 56, 58. Each internal reinforcement grid 56, 58 may comprise at least one layer of steel rebar lattice and/or other internal reinforcement structures such as fiberglass reinforcement mat, geotechnical mat, composite bars, carbon fiber mat, or loose reinforcement material such as fiberglass fibers, carbon fibers, plastic fibers, or metallic shavings. In one or more embodiments, the upper internal reinforcement grid 56 is embedded nearer to the top surface of the roadway section than the wireless battery charger(s) 14 and comprises only those materials listed above or otherwise which are non-metallic, non-ferrite material(s) and will not substantially interfere with, shield against, insulate and/or isolate the electromagnetic field (EMF) emitted upward from the wireless chargers 14, which are positioned below the upper internal reinforcement grids 56. More broadly, it is foreseen that embodiments of the present inventive concept are interoperable with the paving systems and apparatuses described in U.S. Patent Publication No. 2016-0222594 A1 to Sylvester (filed Mar. 30, 2016), and in U.S. Patent Publication No. 2017-0191227 A1 to Sylvester (filed May 16, 2016), each of which is hereby incorporated by reference herein in its entirety.

Figure 3B:
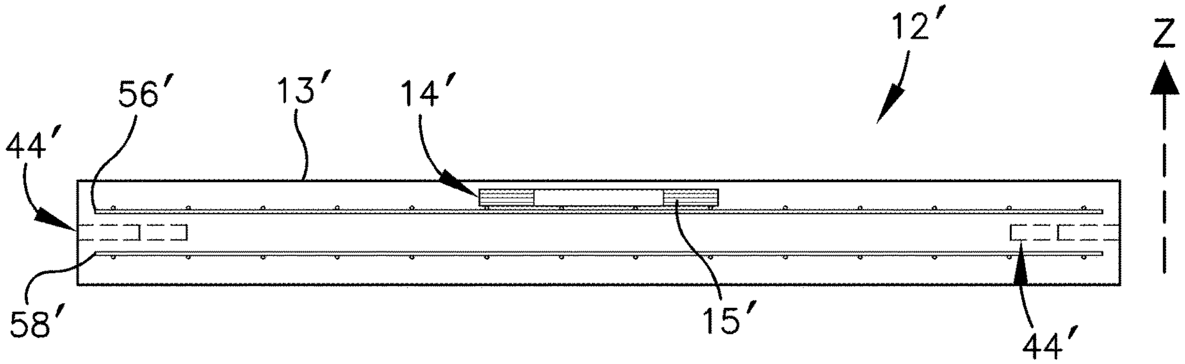
FIG. 3B is a cross section of an alternative roadway section from the pavement system of FIG. 3A, particularly illustrating a plurality of reinforcement layers positioned below the wireless power charger and omitting layer(s) positioned above the charger.

Broadly, it should be noted that a roadway section or slab may include one or more reinforcement grids or layers above and/or one or more reinforcement layers below the embedded wireless battery charger(s). Also or alternatively, reinforcement layers may be omitted from portion(s) above and/or from portion(s) below the wireless battery chargers within the scope of the present invention. For example, and with brief reference to FIG. 3B, in one or more embodiments a plurality of reinforcement layers, including an uppermost reinforcement layer 56' and a lower reinforcement layer 58', may be embedded below wireless battery charger 14', with no reinforcement layers being embedded above the wireless battery charger 14'. Such reinforcement layers may comprise magnetic shielding material and/or non-magnetic shielding material within the scope of the present invention. One of ordinary skill will appreciate that other variations on number and positioning of layers are within the scope of the present invention.

While it is foreseen, as noted above, that embodiments of the present invention may be constructed in the field—for example as part of cast-in-place concrete or continuous pour asphalt installations—or be pre-fabricated into an assembly that can be installed onsite, it is preferred that the strain sensor array 40 be encased and permanently fixed within body during an offsite pre-fabrication process. The optical fiber sensors of the exemplary array 40 may be laminated and/or fixed to one or more sides of a reinforcement layer 56, 58 (fixed relationship not shown, but see, e.g., FIGS. 2-4 of U.S. Patent Publication No. 2017/0191227A1 incorporated by reference herein) of the slab 12 during fabrication, essentially extending in a substantially horizontal (XY) plane at a given height within the slabs 12.

More preferably, the sensors of the array 40 may be laminated and/or fixed to a bottom side of the lower or bottommost reinforcement layer 58 of the slab 12. Placement near the bottom of the body may provide greater resolution from and/or amplification of data collected by the strain sensor array 40. Moreover, fixing the strain sensor array 40 to a reinforcement layer 56 and/or 58 may generate a more holistic data set representing changes in form across the entire body because a preferred reinforcement layer 56, 58 will extend across substantially the entire length and width of the body and may be less susceptible to localized distortions resulting from pockets or imperfections in the body.

It is foreseen that all or portions of a strain sensor array 40 may be encased at different and/or varying heights within a slab without departing from the spirit of the present inventive concept. For instance, disposing at least one sensor at a different height within the slab 12—such as vertically above or below a second sensor—may provide additional resolution for detecting defects in the slab 12. However, long dimensions of the exemplary optical fiber sensors are preferably in substantial alignment with a direction of travel, for example, along the y-axis, which may improve detection of vehicular load progression across a top surface 13 of the slab 12. Dimensions of optical fiber sensors that are transverse or perpendicular to the direction of travel may improve detection of the lateral position of such a vehicular load on the slab 12. It is foreseen that a preferable arrangement of optical fiber sensors, each sensor having a region of the pavement surface that it can optimally sense, and each sensor having an orientation that improves detection of the longitudinal or lateral position of the vehicle load and position, will result in a sensor layout presenting a grid of sensors oriented in the traverse and longitudinal dimensions such that their sensing areas overlap each other along the x and y axes to ensure that a maximum area of the pavement can be sensed simultaneously by one or more sensors (e.g., oriented to the direction of travel and/or lateral position of the vehicle load on the slab 12).

As noted above, in one or more embodiments, load-transferring connectors 48 (see FIG. 4) set in cavities 44 join the slabs 12 to one another along sides extending perpendicular to the direction of travel (i.e., in the “x” direction). In one or more embodiments, load-transferring connectors 48 also join the slabs 12 to one another along sides extending parallel to the direction of travel (i.e., in the “y” direction). The load-transferring connectors 48 may comprise, for example, dowel rods. However, in one or more embodiments, slabs 12 adjacent one another in the “x” direction may be joined using tie bars (not shown) or other load-transferring connectors. Interfaces between slabs 12 may also or alternatively incorporate a rubber skirt, backer board, spacing rod, tar mixture, grouting or similar buffering substance within the scope of the present invention. It is also foreseen that load-transferring connectors may be omitted along one or more sides of slabs or roadway sections without departing from the spirit of the present invention.

Figure 6:
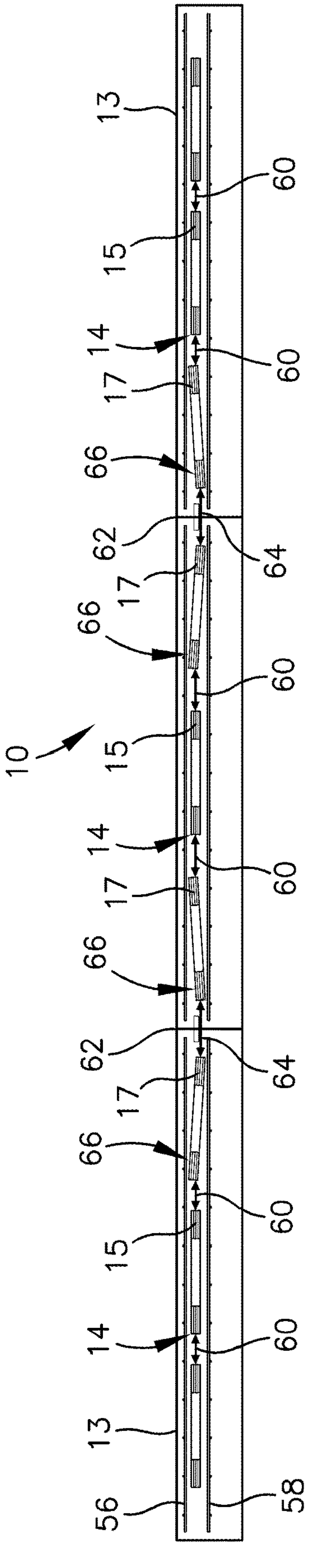
FIG. 6 is a cross section of roadway sections from the pavement system of FIG. 1, taken along or parallel to a y-axis of the system and bisecting a plurality of wireless power chargers, particularly illustrating relative orientations of the wireless power chargers, all embedded within the roadway section.

Turning to FIG. 6, the wireless chargers 14 are spaced apart from one another at distances in the slabs 12 along the longitudinal or y-axis (depicted in FIG. 1). A subset of the distances extend across smaller gaps, for example those gaps that are internal to a slab 12 instead of spanning an interface or a saw cut joint or the like between two (2) adjacent slabs 12 or pavement volumes. Such a subset of shorter distances may not be exactly uniform in length, but are generally shorter or smaller than gaps spanning interfaces or joints between adjacent slabs 12. For ease of reference, the smaller subset of gaps or distances are nonetheless uniformly referred to as the first distance 60, whereas the other subset of larger or longer gaps (e.g., gaps spanning interfaces or joints between adjacent slabs 12) are generally referred to as the second distance 64. One of ordinary skill will similarly appreciate that, while the other subset of larger gaps may not be exactly uniform in distance, they are generally longer or larger than the subset of smaller gaps that are internal to a given one of the slabs 12.

In one or more embodiments, the wireless chargers 14 generally are located within the slabs 12 so that a margin of slab material is maintained between the chargers 14 and the space outside of the slabs 12 as delineated, for example, along the interface between adjacent slabs 12 or pavement volumes (e.g., at edges or sides of the slabs 12, above load-transferring connectors and/or along saw cut joints). For ease of reference, such outside spaces, interfaces or joints are referred to herein as slab joints 62, and those chargers 14 which are adjacent thereto are referred to as chargers 66 herein.

Accordingly, chargers 66 and respective conductive elements 17, on either side of slab joints 62, are spaced apart from each other at relatively longer second distances 64, and from other adjacent chargers 14 at relatively shorter first distances 60.

In one or more embodiments, each longer distance 64 is at least about twenty percent (20%), or at least about fifty percent (50%) longer than each shorter distance 60. In one or more embodiments, each longer distance 64 is at least about twice as long as each shorter distance 60. As used herein, the distances 60, 64 are defined as the horizontal distance between the two closest points on adjacent conductive elements 15, 17. However, the distances 60, 64 may be defined differently without departing from the scope of the present invention, for example where the distances 60, 64 are defined as the shortest distance between the two (2) closest points on adjacent conductive elements 15 and/or 17.

Additionally, while the longitudinal axis, or y-axis, is depicted as being generally parallel to the top surface 13 of the slabs 12, it is foreseen that portions of the top surface 13 of the slabs 12 may not be parallel to the y-axis without departing from the scope of the present invention. For example, the system 10 may be implemented up or down a hill so that the slabs curve upwards or downwards on the z-axis. Further, the system 10 may be implemented around a bend so that the slabs curve laterally on the x-axis and/or change pitch so that the slabs rotate about the y-axis within the scope of the present invention.

It should be noted that longer gaps 64 between adjacent wireless chargers 66 can reduce uniformity of the magnetic field(s) above the slabs 12. In one or more embodiments, one or both conductive elements 17 of each pair of wireless chargers 66 separated by the relatively longer distance 64 are oriented so that magnetic fields emitted therefrom at least partially reduce drops in magnetic flux density above the joints 62 or between the longer gaps 64 relative to systems in which conductive elements adjacent such joints are not oriented or angled in such a manner.

Figure 7:
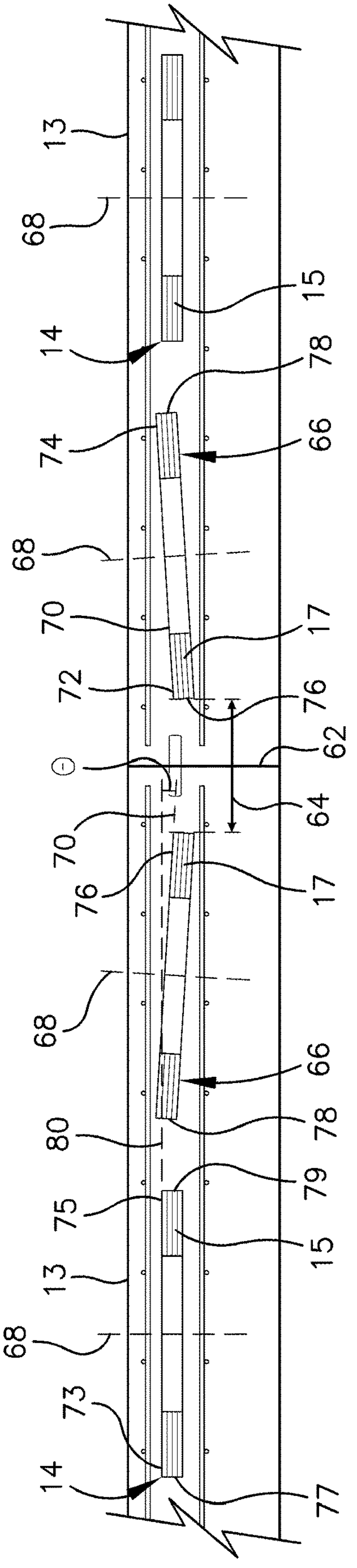
FIG. 7 is an enlarged view of a portion of the pavement system of FIG. 6.

Turning to FIG. 7, in one or more embodiments of the present invention, one or more of the conductive elements 17 of wireless chargers 66 that are separated by the relatively longer distance 64 are oriented so that their magnetic axes 68 are angled toward adjacent joints 62 and/or the longer gaps 64.

The angled aspect of the chargers 66—and, more particularly, of their respective conductive elements 17—can also or alternatively be defined with reference to surfaces of those elements 17. For example, a first of the conductive elements 17 may comprise opposite segments 76, 78, respectively proximate to and distal from the nearest joint 62. In one or more embodiments, the conductive element 17 is substantially annular or otherwise forms a pattern (discussed in more detail above) with one or more central gap(s) between the conductive material forming the opposite segments 76, 78 of the conductive element 17. Each of the other conductive elements 17 may correspondingly have such segments 76, 78.

Each angled conductive element 17 may be oriented so that an imaginary axis 70 extending toward the longer gap 64 and between two top surfaces 72, 74 (or upper surfaces of the conductive element 17) of opposing ends 76, 78 (outermost ends) of the conductive element 17 lies on an imaginary plane that is sloped toward the respective joint 62 and/or longer gap 64. Taking the longitudinal y-axis as the frame of reference, the plane on which the imaginary axis 70 lies may be at an angle θ relative to an imaginary plane on which an imaginary axis 80 extends between two top surfaces 73, 75 of opposing ends 77, 79 of an adjacent regularly oriented conductive element 15. In many embodiments, the angle θ will also be equivalent to an angle formed along the longitudinal y-axis between the magnetic axis 68 of the angled conductive element 17 and corresponding imaginary axis 84 of the angled conductive element discussed in more detail below. Similarly, in many embodiments the angle θ will also be equivalent to the angle θ' minus ninety degrees (90°), also discussed in more detail below. Accordingly, references to the angle θ herein may be taken as referring to the relationship between axes 70, 80, the relationship between axes 68, 84, and/or to the angle θ' minus ninety degrees (90°), and to any combination thereof, within the scope of the present invention.

The imaginary axes 80 of regularly oriented conductive elements 15 may lie on a plane that is generally parallel with the longitudinal or y-axis of the slabs 12. Similarly, the magnetic axes 68 of regularly oriented conductive elements 15 may be generally perpendicular to the longitudinal y-axis of the slabs 12.

In one or more embodiments, the magnitude of the angle θ is related to the distance 64 between the conductive elements 17. In one or more embodiments, the angle θ is a half degree (0.5°) up to ten degrees (10°), inclusive. In one or more embodiments, the angle θ may be at least two and a half degrees (2.5°) up to seven and a half degrees (7.5°), inclusive. In one or more embodiments, the angle θ is a half degree (0.5°) up to five degrees (5°), inclusive. In one or more embodiments, the angle θ is five degrees (5°).

In one or more embodiments, the greater the distance 64, the greater the angle θ. For example, a maximum distance 64 may be assumed variable within a range taking as its high end the maximum separation between conductive elements 17 for effective dynamic charging of passing vehicles at a given operational voltage, and taking as its low end the minimum distance between conductive elements 17 required to avoid damage thereto that would otherwise occur due to proximity to structures and strains present adjacent the corresponding joint 62. If this range is mapped onto a corresponding range for the angle θ (e.g., any of the ranges described in the preceding paragraph above), the angle θ may increase proportionally with the increase in distance 64 at least approximately so that, for example, a distance 64 in the bottom quartile of the distance range will result in an angle θ in the bottom quartile of the angle range, and the like.

In one or more embodiments, the conductive elements 17 of both chargers 66 adjacent to the longer gap 64 of at least one of the joints 62 are angled toward the gap 64. However, in one or more embodiments, only one of the conductive elements 17 of the chargers 66 on either side of at least one of the larger gaps 64 is angled towards the gap 64.

It should also be noted that, while imaginary planes representing the angles or orientations of wireless charger conductive elements are largely defined herein with reference to imaginary axes extending between points along the tops of those conductive elements, the orientations of the conductive elements may also or alternatively be defined with reference to imaginary planes which more generally extend along the tops of the conductive elements. More particularly, such a plane may be defined as that imaginary plane which lies along the greatest amount of surface area of the top of the corresponding conductive element.

Figure 8A:
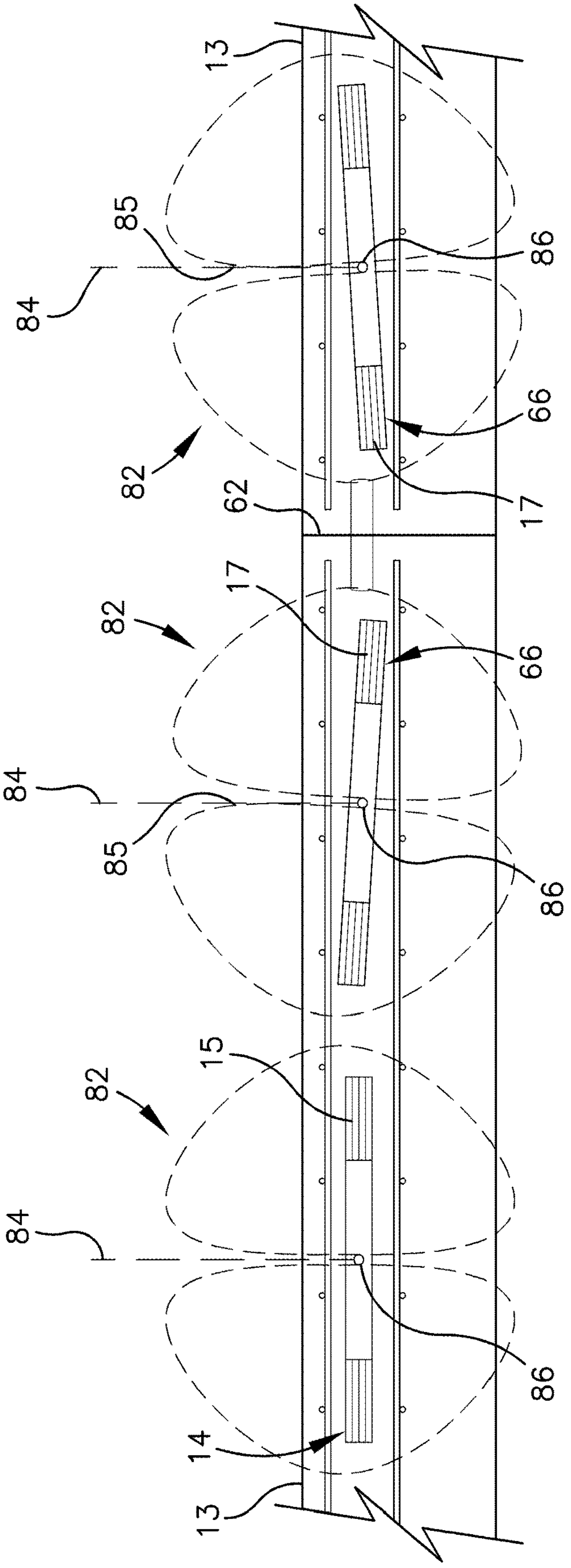
FIG. 8A is an enlarged view of a portion of the pavement system of FIG. 6 depicting exemplary magnetic flux density around chargers.

Turning to FIG. 8A, by orienting the conductive elements 17 in this manner, a magnitude of the magnetic flux density 82 above the top surface 13 of the slabs 12 is highest between the joint 62 and an imaginary axis 84 extending from a center of gravity 86 of the angled conductive element 17 to a nearest point of the top surface 13 of the slab 12. The imaginary axis 84 may form an obtuse angle with the portion of the imaginary axis 70 (depicted in FIG. 7) that extends along the upper portion of the angled conductive element 17 and that is proximate to the longer gap 64. In other words, the magnetic flux density 82 above the slab is at least partially shifted towards the relatively longer gap 64. This shift of the magnetic flux density 82 is represented by the portions 85 of the depicted magnetic flux density 82 intersecting the imaginary axis 84. This reduces a drop of the magnetic flux density above the joints 62 of the slabs 12, or anywhere else there is a relatively larger distance 64 between two conductive elements 15, 17, with at least one of the conductive element 17 being tilted. In one or more embodiments, the magnetic flux density 82 of a regularly oriented conductive element 15 is generally symmetric across the imaginary axis 84.

Figure 8B:
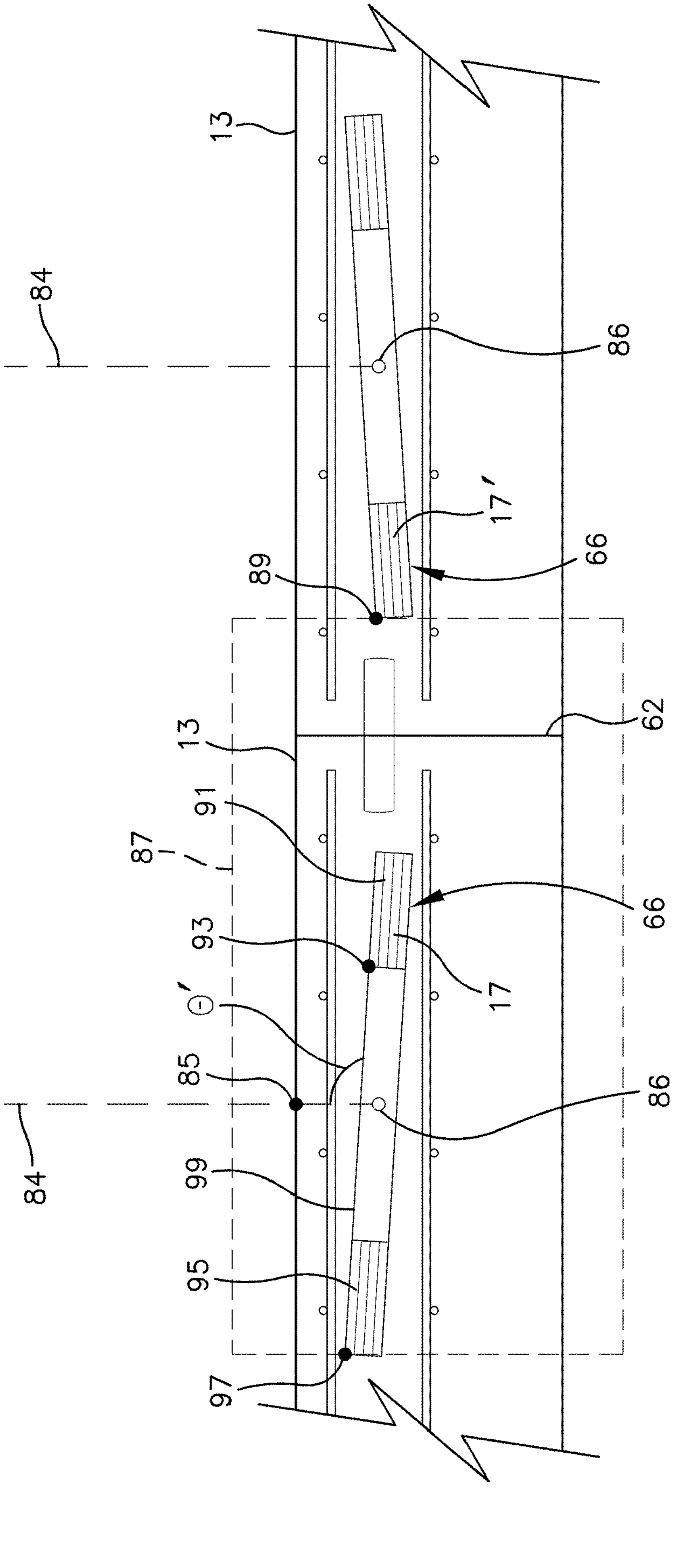
FIG. 8B is an enlarged view of a portion of the pavement of FIG. 6 depicting chargers and their relative orientations.

Turning to FIG. 8B, an exemplary orientation of an angled conductive element 17 relative to an adjacent conductive element 17' that is spaced at the longer distance 64 according to one or more embodiments of the invention is depicted. The relative orientation may be defined as an angle θ' formed on a plane 87 extending from a closest point 89 of the conductive element 17' on the other side of the longer gap 64 and intersecting the imaginary axis 84. The imaginary axis 84 extends through the center of gravity 86 and the closest point 85 of the top surface 13 of its respective slab 12. The imaginary plane 87 intersects the imaginary axis 84, the closest point 85 of the top surface 13, and the closest point 89 of the conductive element 17' on the other side of the longer gap 64. The exemplary angled conductive element 17 includes a first segment 91 that is proximal to the adjacent conductive element 17'. The first segment 91 includes an uppermost point 93 that is intersected by the imaginary plane 87. The uppermost point 93 may be defined as the topmost portion of the first segment 91 in a direction along the imaginary axis 84. The exemplary angled conductive element 17 includes a second segment 95 that is distal from the adjacent element 17' and likewise has an uppermost point 97 that is intersected by the imaginary plane 87. Similarly, the uppermost point 97 may be defined as the topmost portion of the second segment 95 in a direction along the imaginary axis 84.

A theoretical line 99 or axis extends between the two uppermost points 93, 97 and intersects the imaginary axis 84. The intersecting lines or axes 84, 99 define the angle θ' formed on the side of the axis 84 proximal to the adjacent conductive element 17'. In accordance with discussions above relating to angle θ, in one or more embodiments, the angle θ' is obtuse or greater than ninety degrees (90°), is at least ninety and one-half degrees (90.5°), is at least ninety-five degrees (95°), and/or is up to one hundred degrees (100°). Similar to angle θ, in one or more embodiments, the magnitude of angle θ' may depend on the magnitude of the longer gap 64.

While FIG. 8B depicts certain relative positions of the center of gravity 86, the nearest portion 85 of the top of the slab 12, the nearest point 89 of the adjacent conductive element 17', and the uppermost points 93, 97 of the segments 91, 95 of the conductive element 17, these properties can be adjusted without departing from the scope of the invention. For example, a differently shaped conductive element 17 may affect the center of gravity 86, the orientation of the conductive element 17 may affect the angle θ' and therefore the uppermost points 93, 97, the contour of the top surface 13 of the slab 12 may affect the location of the closest point 85 of the slab 12, the angle of the adjacent conductive element 17' may affect the closest point 89 thereof, etc. without departing from the scope of the present invention.

An exemplary description of the operation of the system 10 will now be provided. When the processing element 22 of the control center 16 receives a signal indicative of one or more vehicles traveling on and/or approaching one or more of the slabs 12, the processing element 22 is configured to connect one or more of the chargers 14, 66 to electrical power. The signal may be a signal generated by one or more of the sensor arrays 40, which transmit the signal through edge connectors 52 and junction boxes 54. The processing element 22 may connect the electrical power to one or more of the edge connectors 36 via the switching devices 32 of the junction boxes 30. The switching devices 32 connect the flow of electrical power to the chargers 14, 66 through conductors electrically connected to the chargers 14, 66.

When connected to the electrical power, the conductive elements 15, 17 of the chargers 14, 66 emit magnetic fields that extend above the top surface 13 of the slabs 12. As the vehicle traverses the slabs 12, magnetic flux density is sufficiently produced above the first distances or gaps 60 due to the chargers 14, 66 being relatively closer. The magnetic flux density 82 is sufficiently produced above the longer distances or gaps 64 due to the angled conductive elements 17 emitting magnetic fields at an angle so that magnetic flux density 82 at least partially shifts over the longer gaps 64. The magnetic flux density 82 causes current to be induced in a receiver of the charging system of the vehicle, even when traveling over the longer gaps 64, to thereby wirelessly transfer electrical power to the vehicle.

Figure 9:
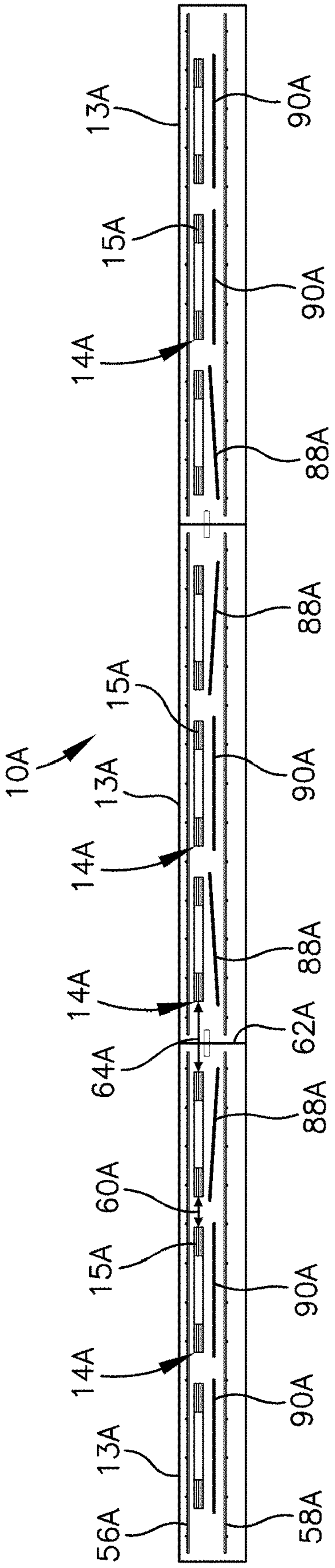
FIG. 9 is a cross section of roadway sections of a pavement system constructed according to one or more embodiments of the invention, taken along or parallel to a y-axis of the system and bisecting a plurality of wireless power chargers, particularly illustrating relative orientations of magnetic shielding layers, all embedded within the roadway section.

A pavement system 10A constructed in accordance with one or more embodiments of the invention is shown in FIG. 9. The pavement system 10A may comprise substantially similar components as pavement system 10; thus, the components of the pavement system 10A that correspond to similar components in pavement system 10 have an 'A' appended to their reference numerals. The principal difference between pavement system 10A and pavement system 10 is that instead of (or in one or more embodiments, in addition to) angling the conductive elements 15A of the chargers 14A to extend magnetic flux density 82A (depicted in FIG. 11) across the wider gaps 64A, magnetic shielding material 88A beneath the chargers 14A adjacent to the wider gaps 64A are oriented to cause the magnetic flux density 82A to extend over the wider gaps 64A.

As depicted, the pavement system 10A comprises a plurality of magnetic shielding layers 88A, 90A comprising magnetic shielding material and being respectively positioned beneath the chargers 14A. The magnetic shielding layers 88A, 90A help redirect the magnetic fields emitted from the chargers 14A. The magnetic shielding layers 88A, 90A may be formed and/or positioned in the slabs 12A and may be electrically isolated from, or not connected via electrically conductive material to, the chargers 14A. In one or more embodiments, the pavement material of the slabs 12A is interposed between the magnetic shielding layers 88A, 90A and the corresponding conductive elements 15A.

As used herein, the term "magnetic shielding material" means any material exhibiting a relative magnetic permeability of at least four (4). In certain embodiments, the magnetic shielding material used will exhibit a relative magnetic permeability of at least at least eight (8), at least ten (10), at least one hundred (100), at least five hundred (500), or at least one thousand (1000). In certain preferred embodiments, such as when the magnetic shielding material comprises ferrite, the magnetic shielding material will have a relative permeability between fifteen hundred (1,500) and three thousand (3,000). Furthermore, in one or more embodiments, the magnetic shielding materials used herein may have a relative magnetic permeability that is at least four (4), at least eight (8), at least ten (10), at least one hundred (100), at least five hundred (500), or at least one thousand (1000) times greater than that of the material from which the roadway sections 10A are formed (e.g., concrete). Examples of magnetic shielding materials include iron, steel, and ferrite. Correspondingly, the term "non-magnetic shielding material" means any material exhibiting a relative magnetic permeability of less than four (4). Examples of non-magnetic shielding material include aluminum, copper, brass, polymers, and fiberglass. In one or more embodiments, the magnetic shielding material comprises non-electrically conductive material, as defined elsewhere herein.

Figure 10A:
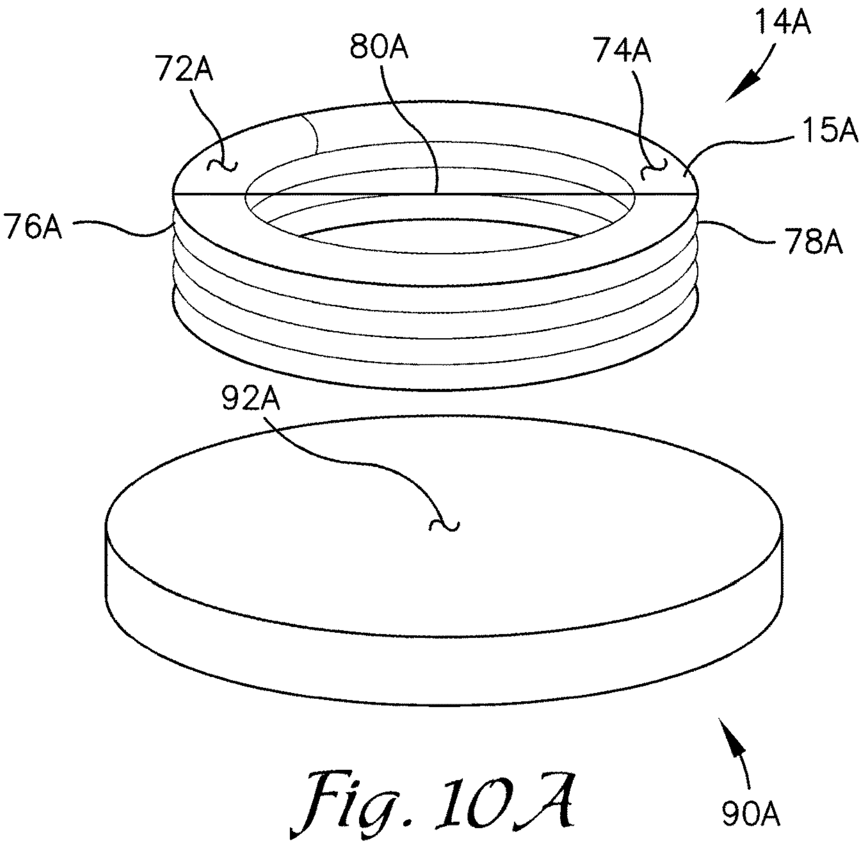
FIG. 10A is a perspective view of an example wireless charger and respective magnetic shielding layer of the pavement system of FIG. 9.
Figure 10B:
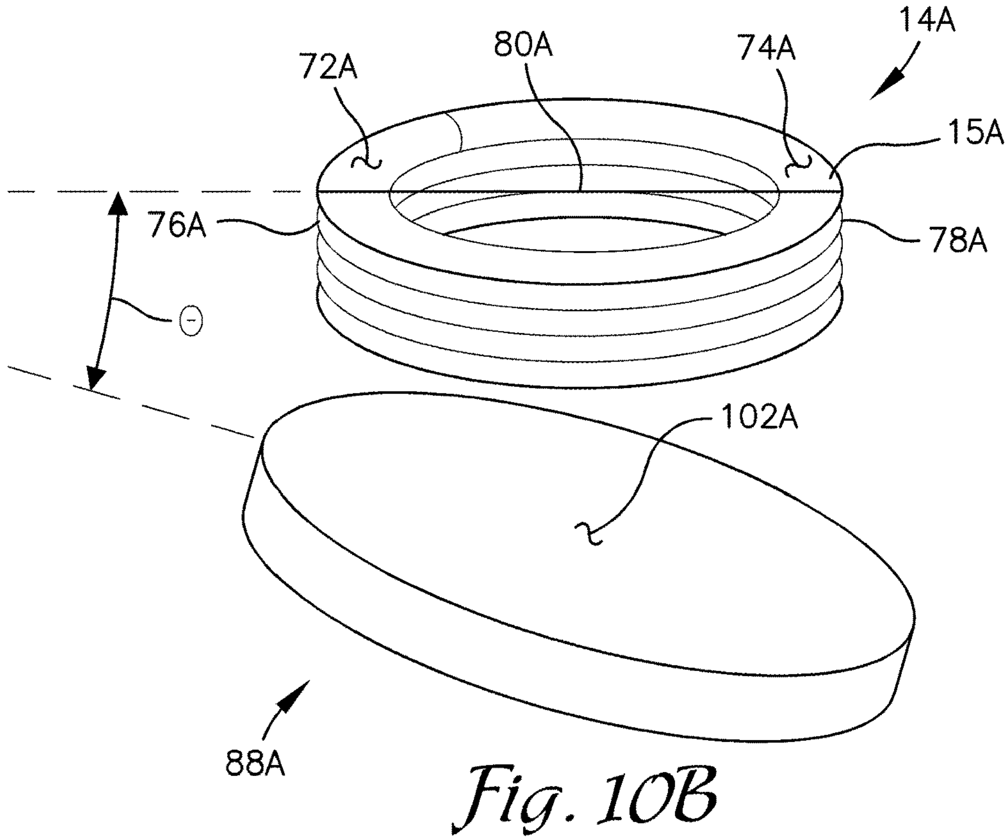
FIG. 10B is a perspective view of an example wireless charger and respective angled magnetic shielding layer of the pavement system of FIG. 9.

Turning to FIGS. 10A and 10B, the magnetic shielding layers 88A, 90A comprise magnetic shielding material formed into plate-like or planar substrates. In one or more embodiments, the magnetic shielding layers 88A, 90A comprise disk-shaped layers with outer radii generally corresponding to, though in some embodiments moderately larger than, the outer radii of the conductive elements 15A. However, the magnetic shielding layers 88A, 90A may be formed into any number of shapes without departing from the scope of the present invention.

As depicted in FIG. 10A, the magnetic shielding layer 90A beneath a charger 14A that is spaced at the relatively shorter distance 60A from adjacent charger(s) 14A may include a top surface 92A that extends generally parallel to the plane in which the conductive element 15A of the corresponding charger 14A extends. In other words, the imaginary axis 80A extending between the top, or uppermost, surfaces 72A, 74A of the opposite segments 76A, 78A of the conductive element 15A (see discussion of segments 72, 74, 76, 78 above), is generally parallel to the top surface 92A of the magnetic shielding layer 90A (which is positioned beneath that corresponding conductive element 15A).

In one or more embodiments, for a charger 14A that is adjacent a longer distance 64A, an imaginary axis 80A extending between the top surfaces 72A, 74A of the outer ends 76A, 78A of the conductive element 15A is at an angle q (as projected onto the plane formed by the y-axis and z-axis discussed above and depicted in FIGS. 1 and 3) to the top surface 92A of the magnetic shielding layer 88A beneath that charger 14A, as depicted in FIG. 10B. In accordance with discussions above relating to angle θ', in one or more embodiments, the angle q is acute or less than ninety degrees (90°), is at least one-half degree (0.5°), is at least five degrees (5°), and/or is up to one ten degrees (10°). Similar to angle θ', in one or more embodiments, the magnitude of angle φ may depend on the magnitude of the longer gap 64A. In one or more embodiments, the angle φ of the magnetic shielding layer 88A may depend on the orientation of the corresponding conductive element 15A of the charger 14A. For example, the angle φ may be reduced in embodiments where the conductive element 15A is angled toward the longer gap 64A.

It should be noted that while the relative orientations of magnetic shielding layers and wireless charger conductive elements are largely defined herein with reference to imaginary axes extending between points along the tops of those conductive elements and the top surfaces of the magnetic shielding layers, the orientations of the magnetic shielding layers may also or alternatively be defined with reference to imaginary planes which more generally extend along the tops of the magnetic shielding layers. More particularly, such a plane may be defined as that imaginary plane which lies along the greatest amount of surface area of the top surface of the corresponding magnetic shielding layer.

Figure 11:
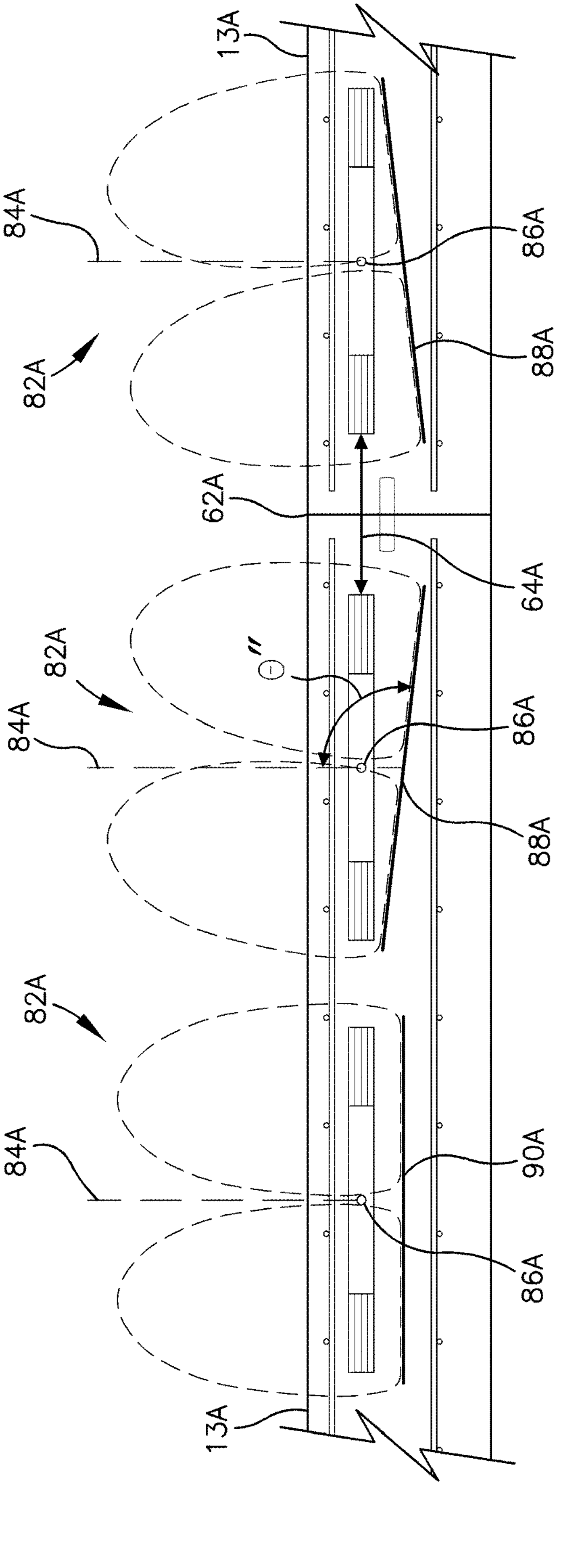
FIG. 11 is an enlarged view of a portion of the pavement system of FIG. 9.

Turning to FIG. 11, magnetic fields emitted from the chargers 14A extend to and are redirected by the magnetic shielding layers 88A, 90A. The tilt of the magnetic shielding layers 88A causes their respective fields to at least partially extend out farther over their respective gaps 64A, thereby increasing the magnetic flux density over the gaps 64A. By orienting the magnetic shielding layers 88A adjacent to the longer gaps 64A in this manner, the magnetic flux density 82A above the top surface 13A of the slab 12A emitted by each charger 14A on either side of the gap 64A is highest at a point between the joint 62A (and/or gap 64A) and an imaginary axis 84A extending from a center of gravity 86A of the chargers 14A to a nearest top surface 13A of the slab 12A. The imaginary axis 84A extending from a center of gravity 86A of the chargers 14A and the imaginary axis 102A extending across the top of the magnetic shielding layer 88A (depicted in FIG. 10B) may form an angle θ' facing the larger gap 64A.

In accordance with discussions above relating to angle θ', in one or more embodiments, the angle θ" is obtuse or greater than ninety degrees (90°), is at least ninety and one-half degrees (90.5°), is at least ninety-five degrees (95°), and/or is up to one hundred degrees (100°). Similar to angle θ', in one or more embodiments, the magnitude of angle θ" may depend on the magnitude of the longer gap 64A. In one or more embodiments, the angle θ" of the magnetic shielding layer 88A may depend on the orientation of the corresponding conductive element 15A of the charger 14A. For example, the angle θ" may be reduced in embodiments where the conductive element 15A is angled toward the longer gap 64A.

The angled magnetic shielding layers 88A shift at least a portion of the magnetic flux density 82A above the slabs 12A emitted by the chargers 14A adjacent to larger gaps 64A towards the gaps 64A. This increases the magnetic flux density above the joints 62A of the slabs 12A, or anywhere else there is a relatively larger distance 64A between two chargers 14A. In one or more embodiments, the magnetic flux density 82A of a regularly oriented charger 14A is generally symmetric across the imaginary axis 84A.

Figure 12:
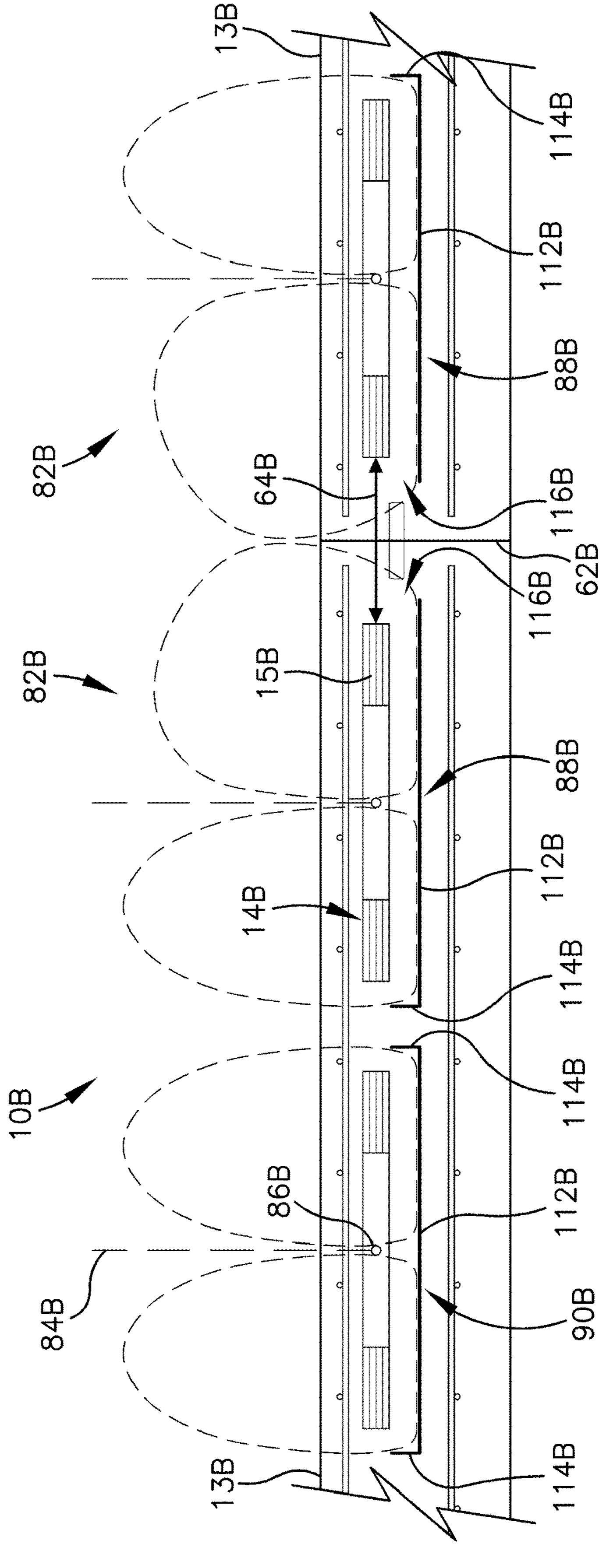
FIG. 12 is a cross section of roadway sections of a pavement system constructed according to one or more embodiments of the invention, taken along or parallel to a y-axis of the system and bisecting a plurality of wireless power chargers, particularly illustrating magnetic shielding shapes, all embedded within the roadway section.

A pavement system 10B constructed in accordance with one or more embodiments of the invention is shown in FIG. 12. The pavement system 10B may comprise substantially similar components as pavement system 10A; thus, the components of the pavement system 10B that correspond to similar components in pavement system 10A have a 'B' appended to their reference numerals. The principal difference between pavement system 10B and pavement system 10A is that instead of (or, in some embodiments, in addition to) angled magnetic shielding layers 88A, the magnetic shielding layers 88B adjacent to larger gaps 64B are shaped to cause the magnetic flux density 82B to extend over the wider gaps 64B.

The magnetic shielding layers 88B, 90B of the pavement system 10B comprise plate-like or planar substrates 112B with one or more walls 114B extending from the substrates 112B. The magnetic shielding layers 88B that are beneath the chargers 14B next to the larger gaps 64B include openings or gaps 116B adjacent to the gaps 64B that cause the magnetic flux density 82B to at least partially shift towards the gaps 64B.

Figure 13A:
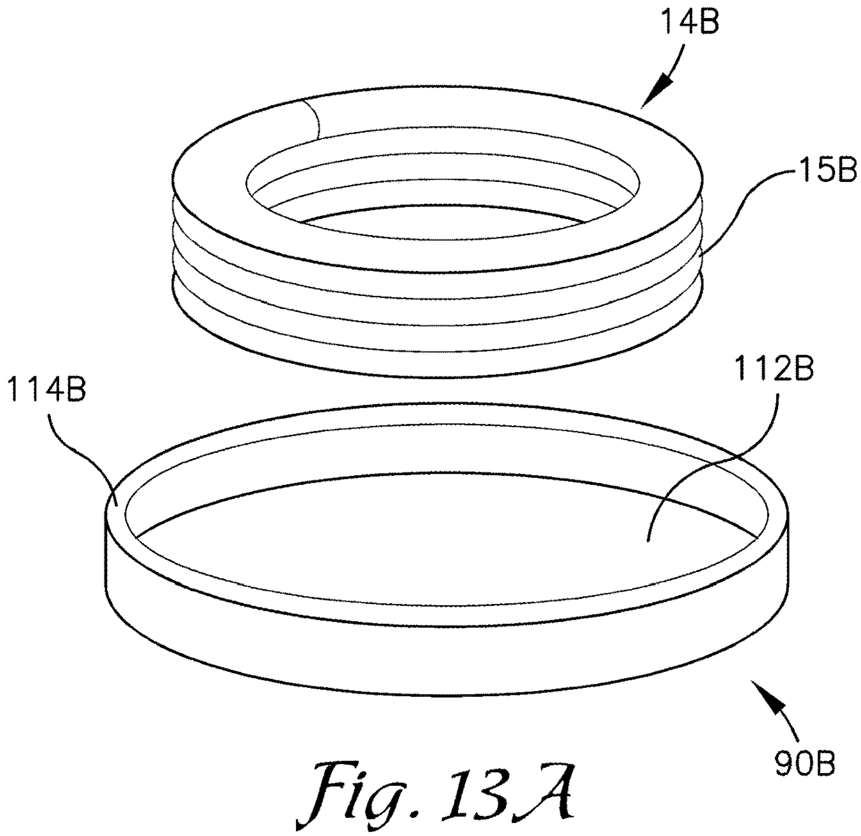
FIG. 13A is a perspective view of an example wireless charger and respective magnetic shielding material of the pavement system of FIG. 12.
Figure 13B:
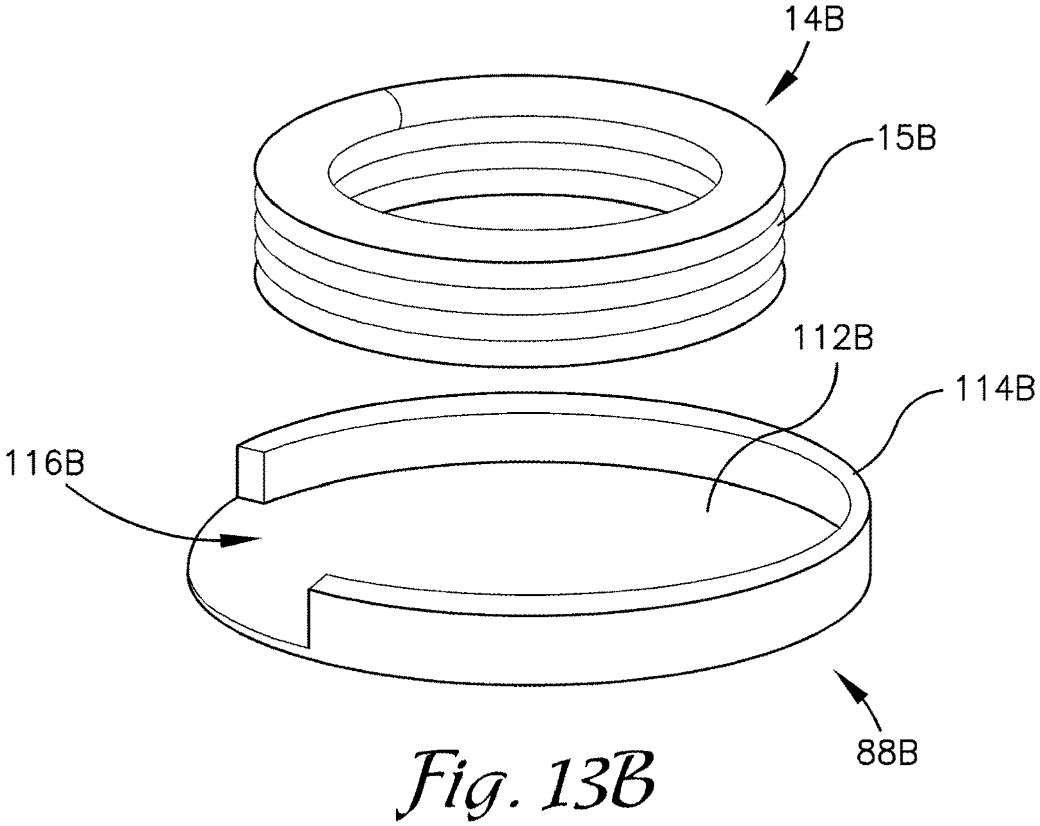
FIG. 13B is a perspective view of an example wireless charger and respective magnetic shielding material with an opening of the pavement system of FIG. 12.

Turning to FIGS. 13A and 13B, the substrates 112B may comprise disk-shaped layers of magnetic shielding material, and the walls 114B may extend therefrom. The gap 116B may be formed in a portion of the wall 114B of the magnetic shielding layer 88B that is adjacent to and at least partially faces the larger gap 64B. The walls 114B may also be formed of magnetic shielding material. The walls 114B of magnetic shielding layers 90B that are beneath relatively shorter spaced conductive elements 15B may circumscribe their respective conductive elements 15B at uniform distances from top surfaces of their respective conductive elements 15B thereby centering the magnetic flux densities emitted by their respective conductive elements 15B along their respective magnetic axes and/or imaginary axes 84B extending from their respective centers of gravity 86B. In one or more embodiments, the shielding layers 88B, 90B are integral with casings or coatings of their respective chargers 14B. One of ordinary skill will appreciate that magnetic shielding layers may be alternatively shaped to increase magnetic flux density over longer gaps within the scope of the present invention.

ADDITIONAL CONSIDERATIONS

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the current technology can include a variety of combinations and/or integrations of the embodiments described herein.

Although the present application sets forth a detailed description of numerous different embodiments, it should be understood that the legal scope of the description is defined by the words of the claims set forth in any subsequent regular utility patent application. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as computer hardware that operates to perform certain operations as described herein.

In various embodiments, computer hardware, such as a processing element, may be implemented as special purpose or as general purpose. For example, the processing element may comprise dedicated circuitry or logic that is permanently configured, such as an application-specific integrated circuit (ASIC), or indefinitely configured, such as an FPGA, to perform certain operations. The processing element may also comprise programmable logic or circuitry (e.g., as encompassed within a general-purpose processor or other programmable processor) that is temporarily configured by software to perform certain operations. It will be appreciated that the decision to implement the processing element as special purpose, in dedicated and permanently configured circuitry, or as general purpose (e.g., configured by software) may be driven by cost and time considerations.

Accordingly, the term "processing element" or equivalents should be understood to encompass a tangible entity, be that an entity that is physically constructed, permanently configured (e.g., hardwired), or temporarily configured (e.g., programmed) to operate in a certain manner or to perform certain operations described herein. Considering embodiments in which the processing element is temporarily configured (e.g., programmed), each of the processing elements need not be configured or instantiated at any one instance in time. For example, where the processing element comprises a general-purpose processor configured using software, the general-purpose processor may be configured as respective different processing elements at different times. Software may accordingly configure the processing element to constitute a particular hardware configuration at one instance of time and to constitute a different hardware configuration at a different instance of time.

Computer hardware components, such as communication elements, memory elements, processing elements, and the like, may provide information to, and receive information from, other computer hardware components. Accordingly, the described computer hardware components may be regarded as being communicatively coupled. Where multiple of such computer hardware components exist contemporaneously, communications may be achieved through signal transmission (e.g., over appropriate circuits and buses) that connect the computer hardware components. In embodiments in which multiple computer hardware components are configured or instantiated at different times, communications between such computer hardware components may be achieved, for example, through the storage and retrieval of information in memory structures to which the multiple computer hardware components have access. For example, one computer hardware component may perform an operation and store the output of that operation in a memory device to which it is communicatively coupled. A further computer hardware component may then, at a later time, access the memory device to retrieve and process the stored output. Computer hardware components may also initiate communications with input or output devices, and may operate on a resource (e.g., a collection of information).

The various operations of example methods described herein may be performed, at least partially, by one or more processing elements that are temporarily configured (e.g., by software) or permanently configured to perform the relevant operations. Whether temporarily or permanently configured, such processing elements may constitute processing element-implemented modules that operate to perform one or more operations or functions. The modules referred to herein may, in some example embodiments, comprise processing element-implemented modules.

Similarly, the methods or routines described herein may be at least partially processing element-implemented. For example, at least some of the operations of a method may be performed by one or more processing elements or processing element-implemented hardware modules. The performance of certain of the operations may be distributed among the one or more processing elements, not only residing within a single machine, but deployed across a number of machines. In some example embodiments, the processing elements may be located in a single location (e.g., within a home environment, an office environment or as a server farm), while in other embodiments the processing elements may be distributed across a number of locations.

Unless specifically stated otherwise, discussions herein using words such as "processing," "computing," "calculating," "determining," "presenting," "displaying," or the like may refer to actions or processes of a machine (e.g., a computer with a processing element 24*d* other computer hardware components) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

The patent claims at the end of this patent application are not intended to be construed under 35 U.S.C. § 112(f) unless traditional means-plus-function language is expressly recited, such as "means for" or "step for" language being explicitly recited in the claim(s).

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A roadway section for enabling dynamic wireless power transfer to a vehicle, the roadway section comprising:

pavement material extending along a longitudinal axis and having a top surface; and first, second and third wireless power chargers spaced apart along the longitudinal axis and respectively comprising first, second and third conductive elements each being configured to emit a magnetic field for dynamic wireless power transfer to the vehicle, wherein— the second conductive element is adjacent to the first conductive element and spaced apart from the first conductive element at a first distance along the longitudinal axis, the third conductive element is adjacent to the second conductive element and spaced apart from the second conductive element at a second distance along the longitudinal axis that is longer than the first distance, the third conductive element has a center of gravity, a first imaginary axis extends through the center of gravity of the third conductive element and a point of the top surface closest to the center of gravity, an imaginary plane intersects the center of gravity of the third conductive element, the closest point of the top surface, and a point on the second conductive element that is closest to the third conductive element, the third conductive element includes: (i) a first segment proximal to the second conductive element and having a first uppermost point in the imaginary plane, and (ii) a second, opposite segment distal from the second conductive element and having a second uppermost point in the imaginary plane, a theoretical line drawn between the first and second uppermost points defines an angle of slope of the third conductive element relative to the first imaginary axis, within the imaginary plane, wherein the angle is measured within the imaginary plane between the theoretical line and the first imaginary axis in a direction extending from the first segment toward the second conductive element, the angle being at least ninety and one-half degrees (90.5°).

2. The roadway section of claim 1, wherein— the imaginary plane is a first imaginary plane, the second conductive element has a center of gravity, a second imaginary axis extends through the center of gravity of the second conductive element and a second point of the top surface closest to the center of gravity of the second conductive element, a second imaginary plane intersects the center of gravity of the second conductive element, the second closest point and a point on the third conductive element that is closest to the second conductive element, the second conductive element includes: (i) a first segment proximal to the third conductive element and having a first uppermost point in the second imaginary plane, and (ii) a second segment distal from the third conductive element and having a second uppermost point in the second imaginary plane, and a second theoretical line drawn between the first and second uppermost points of the first and second segments of the second conductive element defines a second angle of slope of the second conductive element relative to the second imaginary axis, within the second imaginary plane, wherein the second angle is measured within the second imaginary plane between the second theoretical line and the second imaginary axis in a direction extending from the first segment toward the third conductive element, the second angle being at least ninety and one-half degrees (90.5°).

3. The roadway section of claim 1, wherein the angle is at least ninety-five degrees (95°).

4. The roadway section of claim 1, wherein the second distance is at least twice as long as the first distance.

5. The roadway section of claim 1, wherein the third conductive element comprises an electrically conductive coil.

6. The roadway section of claim 5, wherein the coil is operable to emit at least a portion of the corresponding magnetic field with a magnetic axis extending at an acute angle relative to the first imaginary axis.

7. The roadway section of claim 6, wherein the acute angle is at least one-half degree (0.5°).

8. The roadway section of claim 6, wherein the acute angle is five degrees (5°).

9. The roadway section of claim 1, comprising— a first pre-cast slab formed of the pavement material and housing the first and second conductive elements, and a second pre-cast slab formed of the pavement material, the second pre-cast slab being positioned adjacent to the first pre-cast slab and housing the third conductive element.

10. The roadway section of claim 1, wherein the third conductive element is oriented so that a magnetic flux density emitted by the third conductive element and above the top surface is highest at a point located in a direction extending from the first imaginary axis toward the second conductive element.

11. The roadway section of claim 1, wherein— the first conductive element has a center of gravity, a second imaginary axis extends through the center of gravity of the first conductive element and a second point of the top surface closest to the center of gravity of the first conductive element, the first conductive element is configured to emit a magnetic field with a magnetic axis that is parallel to the second imaginary axis.

12. A roadway section for enabling dynamic wireless power transfer to a vehicle, the roadway section comprising:

pavement material extending along a longitudinal axis and having a top surface;

first, second and third wireless power chargers spaced apart along the longitudinal axis and respectively comprising first, second and third conductive elements each being configured to emit a magnetic field for dynamic wireless power transfer to the vehicle, wherein— the second conductive element is adjacent to the first conductive element and spaced apart from the first conductive element at a first distance along the longitudinal axis, the third conductive element is adjacent to the second conductive element and spaced apart from the second conductive element at a second distance along the longitudinal axis that is longer than the first distance, and the third conductive element is oriented so that the third conductive element is operable to emit a magnetic field with a magnetic axis extending in a direction toward the top surface and the second conductive element.

13. The roadway section of claim 12, wherein the direction is a first direction, the first conductive element is operable to emit a magnetic field with a magnetic axis extending in a second direction toward the top surface, and the second conductive element is oriented so that the second conductive element is operable to emit a magnetic field with a magnetic axis extending in a third direction that is parallel to the second direction.

14. The roadway section of claim 12, wherein the direction is a first direction, the first conductive element is operable to emit a magnetic field with a magnetic axis extending in a second direction toward the top surface, and the second conductive element is oriented so that the second conductive element is operable to emit a magnetic field with a magnetic axis extending in a third direction that is oblique to the first direction and toward the top surface and the third conductive element.

15. The roadway section of claim 12, further comprising a fourth conductive element adjacent to the third conductive element and spaced apart from the third conductive element at a third distance that is less than the second distance.

16. The roadway section of claim 15, wherein the direction is a first direction, the fourth conductive element is operable to emit a magnetic field with a magnetic axis extending in a second direction toward the top surface, and the first direction is at an angle of 0.5 degrees to 5 degrees relative to the second direction.

17. The roadway section of claim 12, wherein each of the first, second and third conductive elements comprises one or more coils.

18. The roadway section of claim 12, wherein— the first conductive element has a center of gravity, an imaginary axis extends through the center of gravity of the first conductive element and a point of the top surface closest to the center of gravity, the first conductive element is configured to emit a magnetic field with a magnetic axis that is parallel to the imaginary axis.

19. A roadway section for enabling dynamic wireless power transfer to a vehicle, the roadway section comprising:

pavement material defining a longitudinal axis and a top surface; and first, second and third wireless power chargers spaced apart along the longitudinal axis and respectively comprising first, second and third conductive elements each being configured to emit a magnetic field for dynamic wireless power transfer to the vehicle, wherein— the second conductive element is adjacent to the first conductive element and spaced apart from the first conductive element at a first distance along the longitudinal axis, the third conductive element is adjacent to the second conductive element and spaced apart from the second conductive element at a second distance along the longitudinal axis that is longer than the first distance, the third conductive element has a center of gravity, an imaginary axis extends through the center of gravity of the third conductive element and a point of the top surface closest to the center of gravity, and the third conductive element is oriented so that a magnetic flux density emitted by the third conductive element and above the top surface is highest at a point located in a direction extending from the imaginary axis toward the second conductive element.

20. The roadway section of claim 19, comprising a fourth wireless power charger comprising a fourth conductive element adjacent to the third conductive element and spaced apart from the third conductive element at a third distance that is less than the second distance.

* * * * *